United States Patent
Auranen

(10) Patent No.: US 7,620,120 B2
(45) Date of Patent: Nov. 17, 2009

(54) INTEROPERABILITY IMPROVEMENT IN TERMINALS HAVING A TRANSMITTER INTERFERING WITH A RECEIVER

(75) Inventor: Tommi Auranen, Turku (FI)

(73) Assignee: Nokia Corporation, Espoo (FI)

(*) Notice: Subject to any disclaimer, the term of this patent is extended or adjusted under 35 U.S.C. 154(b) by 443 days.

(21) Appl. No.: 11/229,998

(22) Filed: Sep. 19, 2005

(65) Prior Publication Data

US 2007/0064835 A1    Mar. 22, 2007

(51) Int. Cl.
  *H03K 9/00* (2006.01)
(52) U.S. Cl. ................................................ 375/316
(58) Field of Classification Search .............. 375/316
  See application file for complete search history.

(56) References Cited

U.S. PATENT DOCUMENTS

| | | | |
|---|---|---|---|
| 4,876,545 A * | 10/1989 | Carlson et al. ............. 342/14 |
| 5,896,375 A * | 4/1999 | Dent et al. ................. 370/347 |
| 6,442,375 B1 * | 8/2002 | Parmentier ................. 455/78 |
| 6,892,076 B2 | 5/2005 | Maalismaa et al. ........ 455/552.1 |
| 2003/0228892 A1 * | 12/2003 | Maalismaa et al. ........ 455/575.7 |
| 2003/0236065 A1 * | 12/2003 | Leinonen et al. ............ 455/3.05 |
| 2004/0157578 A1 * | 8/2004 | Auranen ..................... 455/278.1 |
| 2005/0147186 A1 * | 7/2005 | Funamoto et al. ........... 375/324 |
| 2005/0170798 A1 * | 8/2005 | Maalismaa et al. ......... 455/168.1 |
| 2005/0215204 A1 * | 9/2005 | Wallace et al. ............. 455/78 |
| 2006/0130101 A1 * | 6/2006 | Wessel van Rooyen ..... 725/100 |
| 2006/0135083 A1 * | 6/2006 | Leinonen et al. ............ 455/78 |
| 2006/0135195 A1 * | 6/2006 | Leinonen et al. .......... 455/550.1 |
| 2006/0209779 A1 * | 9/2006 | Rousu et al. ................ 370/343 |
| 2007/0082622 A1 * | 4/2007 | Leinonen et al. ............ 455/78 |

FOREIGN PATENT DOCUMENTS

EP    1 043 874 A2    10/2000

WO    WO-03/073683 A1    9/2003

OTHER PUBLICATIONS

Written opinion of International search authority of case PCT/IB2006/002572 dated Dec. 4, 2007.*
International Search report of case PCT/IB2006/002572 dated Dec. 4, 2007.*
Acher, "Digital broadcast networks supporting split-path communication for mobile devices", 23rd International Conference on Distributed Computing Systems Workshops, 2003 Proceedings May 19-22, 2003 pp. 294-299.*

(Continued)

*Primary Examiner*—Juan A Torres
(74) *Attorney, Agent, or Firm*—Harrington & Smith, PC

(57) ABSTRACT

A method is performed in a receiver including a number of modules. The method includes receiving information in a reception frequency band. Responsive to a notification from a transmitter of a transmission in a predetermined transmission frequency band, at least one countermeasure is performed by at least one of the modules. The at least one countermeasure is predetermined to reduce an effect of interference caused by transmission on reception of the information in the reception frequency band. Countermeasures include freezing an automatic gain control loop, freezing a synchronization loop, discarding channel estimation data, and blanking received information. Transmission power and transmission mode are also used to determine whether and how many countermeasures are used. Additionally, handover is improved by waiting until transmission is complete to determine receiver signal strength of signals from potential transmitters for handover.

38 Claims, 13 Drawing Sheets

OTHER PUBLICATIONS

"Efficient FFT And Equalizer Implementation For OFDM Receivers", Fechtel, Stefan A. et al., IEEE Transactions on Consumer Electroncis, vol 45, No. 4, Nov. 1999, pp. 1104-1107.

"Advanced Receiver Chip For Terrestrial Digital Video Broadcasting: Architecture And Performance", Fechtel, Stefan A. et al., IEEE Transactions on Consumer Electronics, vol. 44, No. 3, Aug. 1998, pp. 1012-1018.

"Optimum Receiver Design for OFDM-Based Broadband Transmission—Part II: A Case Study", Speth, Michael et al., IEEE Transactions on Communications, vol. 49, No. 4, Apr. 2001, pp. 571-578.

"Soft Handover in Terrestrial Broadcast Networks", Vare, Jani et al., IEEE International Conference on Mobile Data Management, 2004, pp. 236-242.

* cited by examiner

INTEROPERABILITY IMPROVEMENT IN TERMINALS HAVING A TRANSMITTER INTERFERING WITH A RECEIVER

TECHNICAL FIELD

This invention relates generally to terminals having transmitters and receivers and, more specifically, relates to terminals having a transmitter, such as Global System for Mobile communications (GSM) transmitter, that interferes during transmission with reception by a receiver, such as a Digital Video Broadcast-Handheld (DVB-H) receiver.

BACKGROUND OF THE INVENTION

Because mobile terminals such as cellular phones are battery powered unless plugged into a secondary power source, power usage is a critical design element. In response to these power usage requirements, the DVB-H (a version of Digital Video Broadcast, DVB, for handheld devices) standard was created. DVB-H offers the ability to receive television while using mobile terminals. One power-saving feature is that a DVB-H receiver will receive only during certain time slices. When not receiving, the DVB-H receiver can be put to sleep.

While DVB-H is a benefit, current implementations of DVB-H in mobile terminals also have certain problems. For instance, a mobile terminal typically will contain at least one transmitter that transmits using one or more frequency bands. In particular, voice and data can be communicated from the mobile terminal to a base station. The DVB-H receiver generally receives in a frequency band that is different from the one or more frequency bands used by any transmitter in the mobile station. For instance, certain mobile terminals can support the global system for mobile communications (GSM) standard, and the frequency bands used by a GSM transmitter are different from the frequency band used by a DVB-H receiver. Although the frequency bands of transmission and reception are different, transmitting using one frequency band can still cause interference in the frequency band used by the DVB-H receiver.

It would therefore be desirable to provide techniques that can reduce this interference and therefore improve interoperability between transmitters and receivers in terminals such as mobile terminals.

BRIEF SUMMARY OF THE INVENTION

The present invention provides techniques that improve interoperability in terminals having a transmitter interfering with a receiver.

In an exemplary embodiment, an apparatus is disclosed that includes a receiver adapted to be coupled to an antenna and to a transmitter. The receiver has control logic and a number of modules. The control logic is adapted to control the modules to receive information in a reception frequency band from the antenna. The control logic is also responsive to a notification from the transmitter of a transmission in a predetermined transmission frequency band to cause one or more countermeasures to be performed by one or more of the modules. The one or more countermeasures are predetermined to reduce an effect of interference caused by transmission on reception of the information in the reception frequency band.

In another exemplary embodiment, a method is disclosed that is performed in an apparatus having a receiver including a number of modules. The method includes receiving information in a reception frequency band. Responsive to a notification from a transmitter of a transmission in a predetermined transmission frequency band, the method further causes one or more countermeasures to be performed by one or more of the modules. The one or more countermeasures are predetermined to reduce an effect of interference caused by transmission on reception of the information in the reception frequency band.

In yet another exemplary embodiment, an apparatus includes a receiver. The receiver includes means for receiving information in a reception frequency band, the means for receiving including a number of modules. The receiver also includes means for receiving a notification from a transmitter of a transmission in a predetermined transmission frequency band. The receiver further includes means, responsive to the notification, for causing at least one countermeasure to be performed by one or more of the modules. The one or more countermeasures are predetermined to reduce an effect of interference caused by transmission on reception of the information in the reception frequency band.

In another exemplary embodiment, a signal bearing medium is disclosed that tangibly embodies a program of machine-readable instructions executable by a digital processing apparatus to perform operations in an apparatus including a receiver having a number of modules. The operations include receiving information in a reception frequency band. The operations further include, responsive to a notification from a transmitter of a transmission in a predetermined transmission frequency band, causing one or more countermeasures to be performed by one or more of the modules. The one or more countermeasures are predetermined to reduce an effect of interference caused by transmission on reception of the information in the reception frequency band.

In an additional exemplary embodiment, an apparatus is disclosed that includes a receiver adapted to be coupled to an antenna and to a transmitter. The receiver includes control logic and a number of modules. The control logic is adapted to control the plurality of modules to receive information in a reception frequency band from the antenna. The control logic determines whether a handover process for the receiver has started. Additionally, the control logic is responsive to a notification from the transmitter of a transmission in a predetermined transmission frequency band and is responsive to starting of the handover process to delay measurement of receiver signal strength of signals from at least one other transmitter until after the plurality of burst transmissions end. The measurement of receiver signal strength uses at least one of the modules.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

The invention is relevant to terminals, such as mobile terminals, that have both a DVB-H receiver (or other broadcast radio receiver, such as digital audio broadcasting, DAB; Mediaflow digital video broadcasting, DVB; terrestrial digital multimedia broadcasting, T-DMB; and integrated services digital broadcasting, ISDB-T) and a GSM transmitter (or other transmitters that cause interference with a broadcast radio receiver). The simultaneous usage of the two radio systems needs to be improved, as explained in certain examples below. Therefore, improvement in DVB-H and GSM (for example) interoperability is needed.

As described in more detail below, exemplary embodiments of the disclosed invention provide countermeasures used to reduce effects of interference caused by transmission of data in one frequency band (e.g., GSM) while information is received in another frequency band (e.g., DVB-H). For ease of reference, the present disclosure is divided into Introduction and Exemplary Embodiments sections.

Introduction

Figure 1:
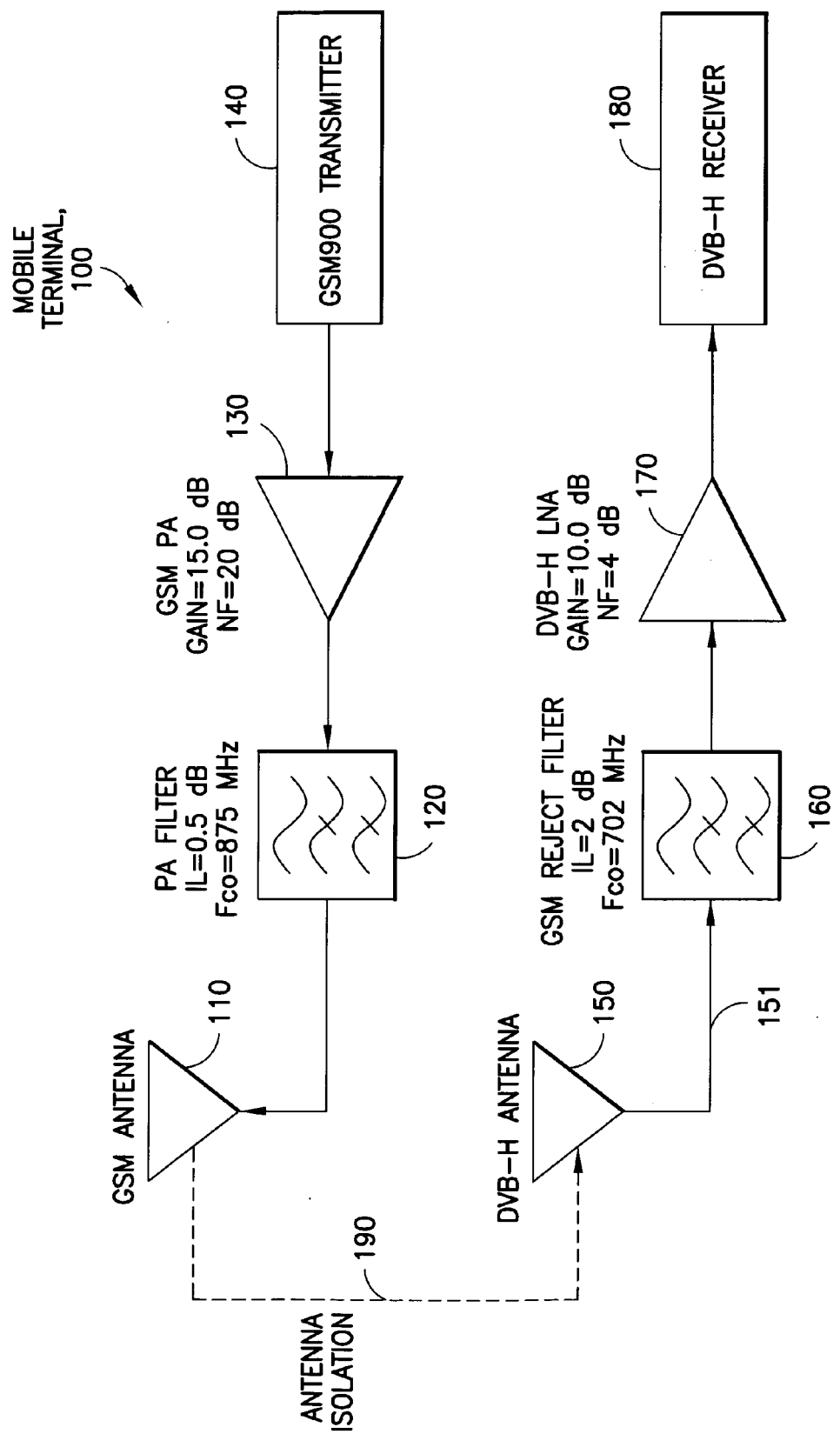
FIG. 1 is a block diagram of an exemplary mobile terminal, used to illustrate problems with transmission in one frequency band while receiving in another frequency band.

Referring now to FIG. 1, a block diagram is shown of an exemplary mobile terminal 100. FIG. 1 is used to illustrate problems with transmission in one frequency band while receiving in another frequency band. Mobile terminal 100 comprises a GSM transmitter 140, a GSM power amplifier (PA) 130, a PA filter 120, a GSM antenna 110, a DVB-H antenna 150, a GSM reject filter 160, a DVB-H low noise amplifier (LNA) 170, and a DVB-H receiver 180. In this example, the GSM transmitter 140 operates in the GSM900 band (European Union specification), from 880-915 megahertz (MHz). The DVB-H receiver 180 operates in this example from 470-702 MHz (also the European Union specification). Although the GSM transmitter 140 is shown separately from the GSM PA 130, PA filter 120, and GSM antenna 110, the GSM transmitter 140 can include one or more of these. Similarly, although the DVB-H receiver 180 is shown separately from the DVB-H LNA, GSM reject filter 160, and the DVB-H antenna 150, the DVB-H receiver 180 can include one or more of these. Also shown in FIG. 1 is the insertion loss (IL) and cut off frequencies (Fco) for the filters 120, 160 and noise figures (NF) for the GSM PA 130 and the DVB-H LNA 170.

Antenna isolation 190 represents that part of the signal and noise transmitted from the GSM transmitter 140 that will couple to the DVB-H receiver input 151 via the antennas. If the coupled signal is, for example, 20 decibels (dB) lower in the DVB-H receiver input 151, then the antenna isolation is said to be 20 dB. Antenna isolation 190 can be measured, for instance, using a network analyzer by feeding the GSM antenna 110 input from the PA filter 120 and measuring the DVB-H antenna output (e.g., at the DVB-H receiver input 151). The signal attenuation is the antenna isolation 190.

Because the antenna isolation 190 is not "perfect", typically a strong GSM900 transmission signal will couple to the DVB-H antenna 150. This signal is partly attenuated by the antenna isolation 190, but the strength compared to the desired DVB-H signal is still very strong. As an example, if the antenna isolation 190 is 15 dB, the signal entering the DVB-H receiver input 151 is for example +33 dBm (e.g., GSM output power)−15 dB=18 dBm (decibels referenced to one milliwatt), which is quite high (e.g., as illustrated in FIG. 2).

This strong signal causes blocking and desensitization in the DVB-H receiver 180. In other words, the DVB-H noise figure increases because of the 18 dBm blocker signal, and the sensitivity of the DVB-H receiver drops. This phenomenon is described is standard radio frequency (RF) text books.

Figure 2:
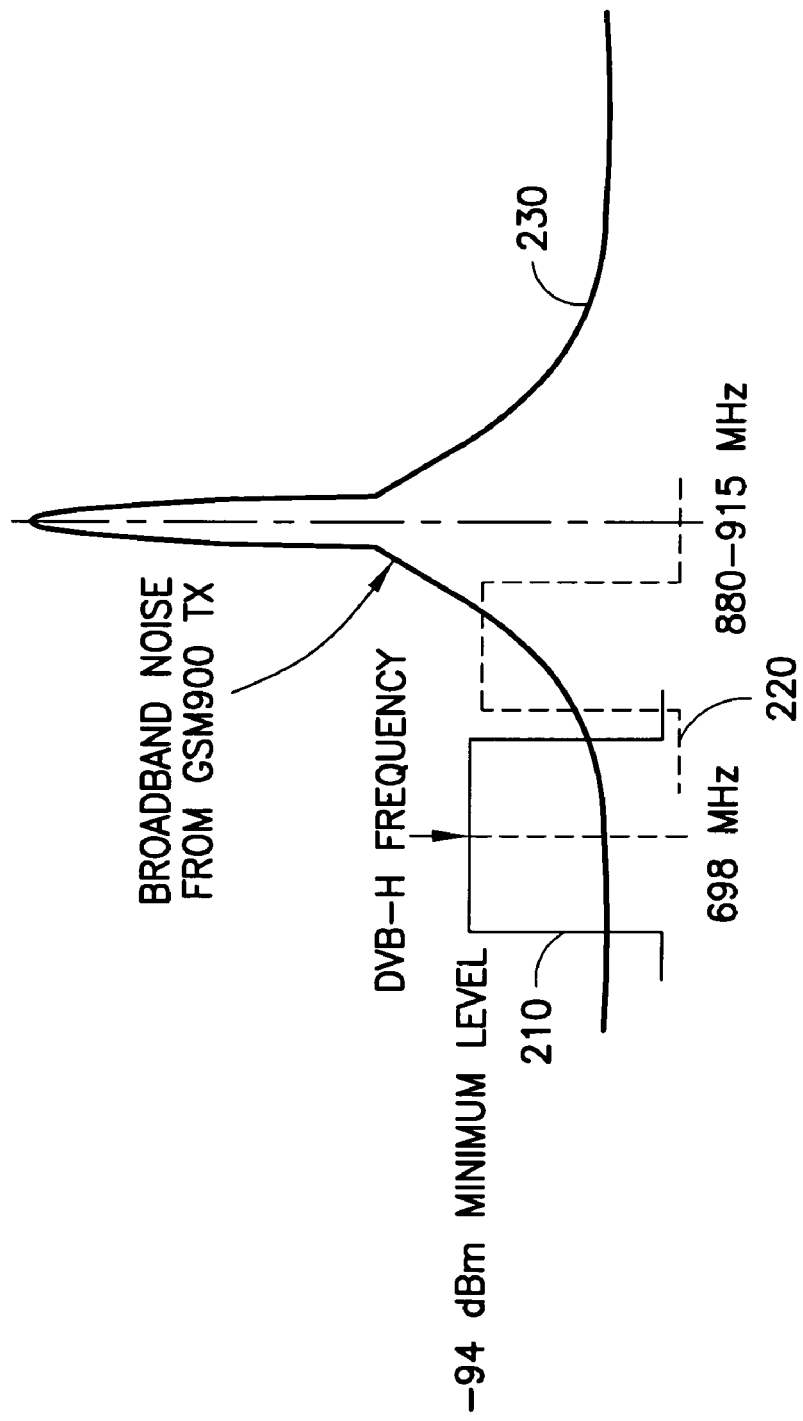
FIG. 2 is an illustration of overlapping frequency bands for transmission and reception.

FIG. 2 shows how a DVB-H receiver 180 might be disturbed by the wideband noise coming from the GSM transmitter 140. FIG. 2 shows a frequency spectrum 230 that is representative of a GSM900 transmission and includes broadband noise. GSM900 (and other GSM frequency bands) are defined by GSM standards. In this example, the frequency spectrum 210 represents a DVB-H reception frequency band centered at 698 MHz. The DVB-H channel raster in Europe is 8 MHz, i.e., ±4 MHz around 698 MHz. The actual width of the DVB-H signal is slightly smaller than the 8 MHz slot, i.e., 7.61 MHz, to leave some space between the channels. As shown in FIG. 2, there is still a significant amount of broadband noise that overlaps the DVB-H frequency band. The broadband noise comes on top of the wanted DVB-H reception signal (e.g., frequency spectrum 210).

The center frequency of 698 MHz has been one recommendation in DVB-H standards for the highest DVB-H center frequency (i.e., a 702 MHz channel border). This 698 MHz recommendation is given in International Electrotechnical Commission (IEC) standard "Mobile and Portable DVB-H Radio Access, Part 1: Interface Specification (TA1)," project number PT62002-1. This is also known as the mobile and portable DVB-T/H radio access interface (MBRAI) specification. Nonetheless, regulations allow for center frequencies to be used up to 858 MHz (i.e., channel border 862 MHz). This is illustrated by frequency spectrum 220. In the latter case, interoperability with GSM900 is extremely difficult, because the distance to the GSM900 transmission signal is only 880-862 MHz=18 MHz. In the latter case, the required steepness increases too much for a filter (e.g., PA filter 120) to filter the GSM900 transmission. The complexity of the filter will be too difficult for practical realization. Because of real life lossy components (e.g., inductors and capacitors are not ideal but will have resistive losses), the insertion loss of this complicated filter would be too high because of the many elements the filter would need to have. Too much GSM PA 130 power would be lost to the filter passband losses.

Figure 3:
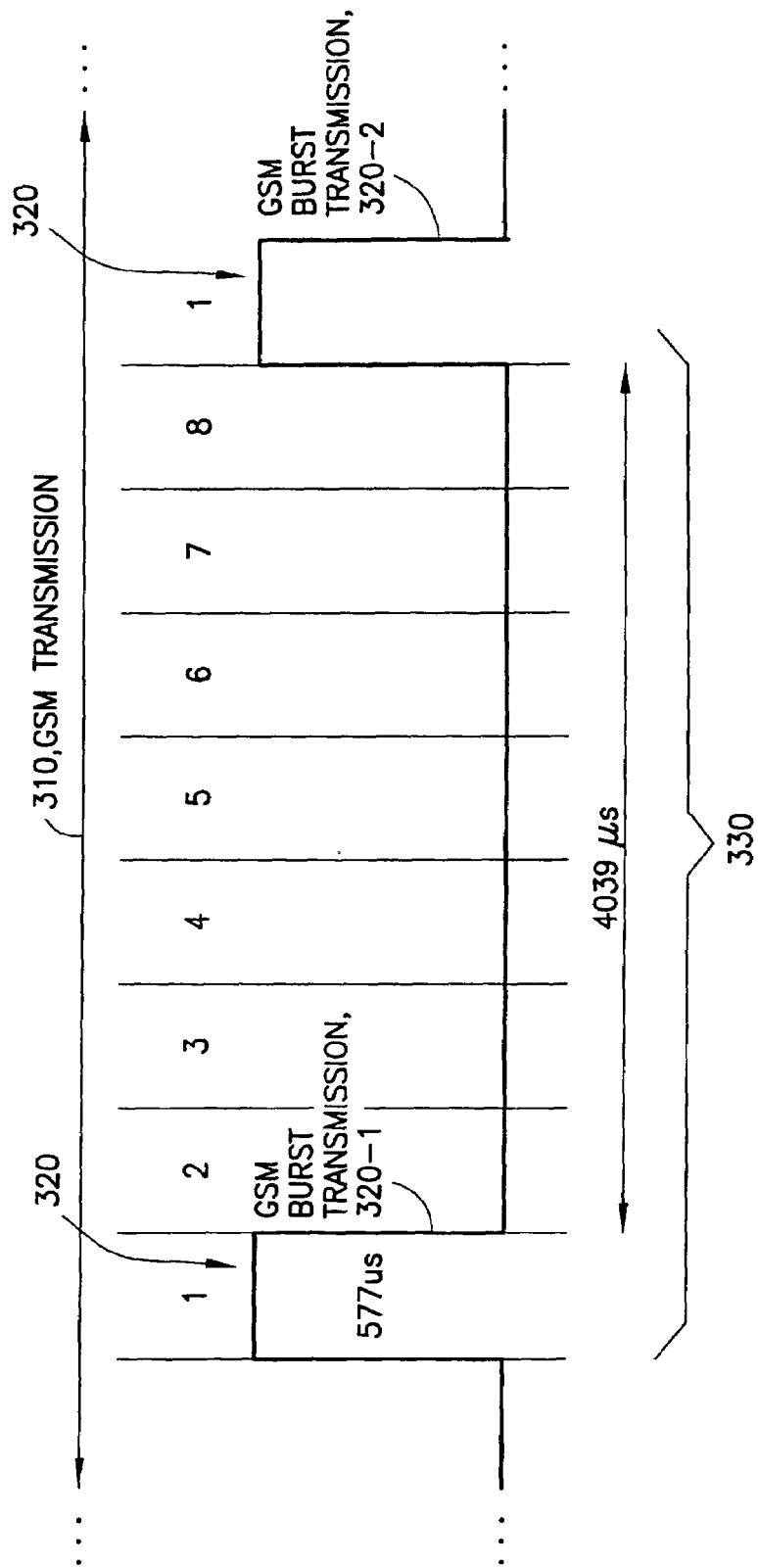
FIG. 3 is an illustration of a GSM burst structure.

The broadband noise comes in bursts because of the GSM transmission time division multiplex (TDM) system, illustrated as a GSM burst structure in FIG. 3. The GSM burst structure illustrated in FIG. 3 indicates when the GSM transmitter 140 would be transmitting (e.g., the GSM transmitter 140 would be active, or "on", during period 1 for 577 microseconds and inactive, or "off" for 4039 microseconds). Period 1 is when a GSM burst transmission 320-1 occurs in this example. A current state of transmitting or a current state of receiving is called an active state of the transmitter or receiver, respectively. During the active state, the transmitter or receiver is "on". A current state of not transmitting or a current state of not receiving is called an inactive state of the transmitter or receiver, respectively. During the inactive state, the transmitter or receiver is "off". FIG. 3 indicates that a GSM transmission 310 can include a number of GSM burst transmissions 320-1 and 320-2. Typically, a GSM transmission will include multiple GSM burst transmissions shown in FIG. 3. Additionally, the GSM burst transmissions 320 may not always follow the GSM burst structure shown in FIG. 3. For instance, one or more GSM burst transmission 320 might be "missing" (e.g., not in position 1 for a frame 330) for certain reasons. For example, if a user is silent, a mobile terminal can go to a discontinuous transmission (DTX) mode and send more seldom GSM burst transmissions 320. GSM burst transmissions 320 (and GSM transmissions 310) include voice and data (e.g., GPRS) transmissions.

The broadband noise bursts that occur during the GSM burst structure in FIG. 3 cause prolonged errors in DVB-H receiver 180, because items such as DVB-H synchronization, channel estimation, and automatic gain control diverge during the GSM burst transmissions 320. The decoding errors are therefore not limited to the burst time, but are much longer. Therefore, the average error rate is higher than expected. A second problem is blocking and desensitization caused by the GSM burst transmission 320 signal itself, as discussed above with respect to FIG. 1.

Figure 4:
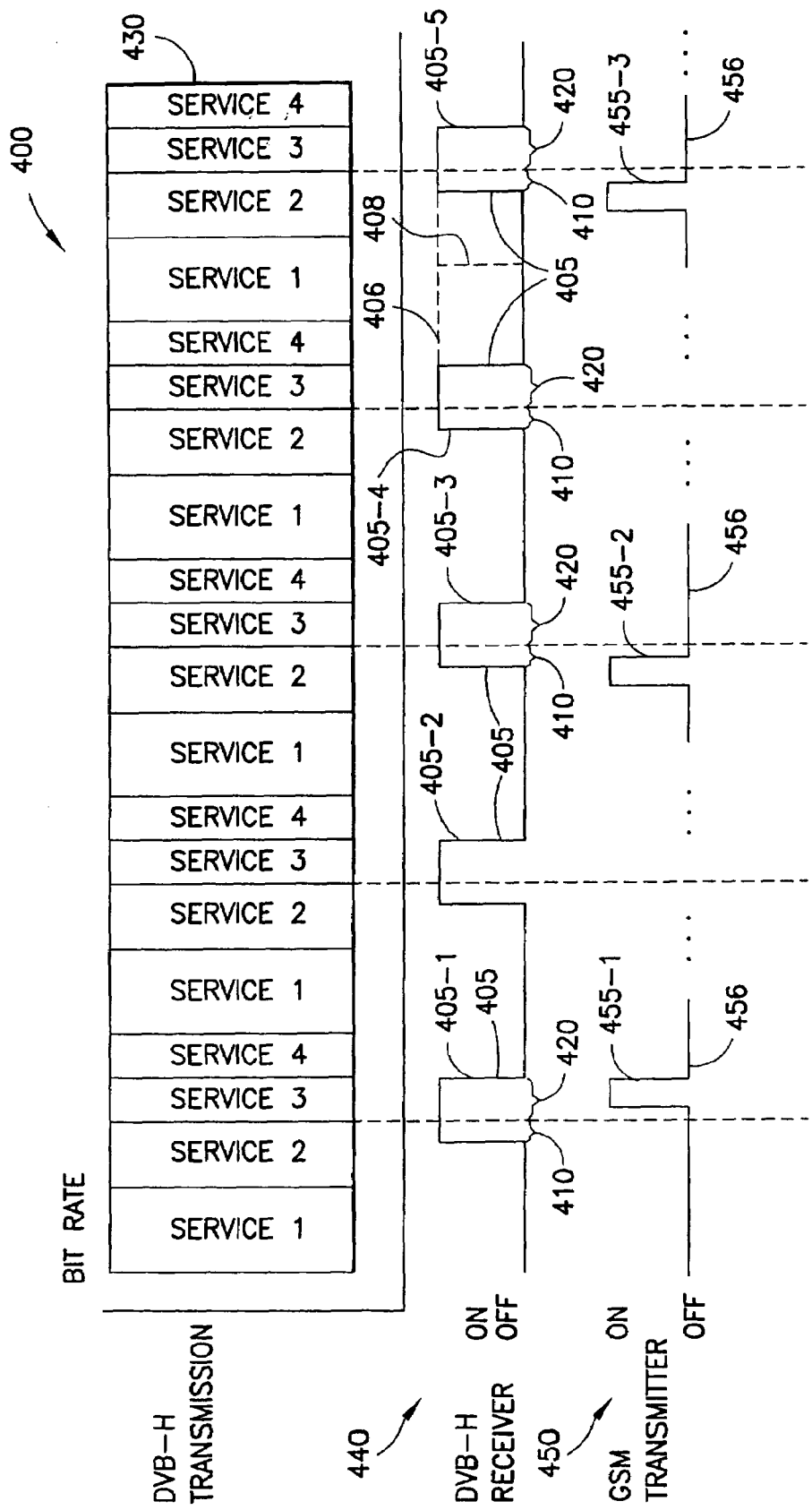
FIG. 4 is an illustration of DVB-H reception and possible interference with GSM burst transmissions.

Another problem caused by the broadband noise bursts is that the bursts can interfere with DVB-H synchronization during acquisition. FIG. 4 is an illustration of DVB-H reception and possible interference with GSM burst transmissions. FIG. 4 shows an illustration of a DVB-H transmission 400 that includes a DVB-H transmission schedule 430, a DVB-H receiver On/Off structure 440 and a GSM transmitter On/Off structure 450. In the example of FIG. 4, the GSM burst transmission 320 is represented by the active periods 455, which will generally be true (e.g., when the GSM transmitter is active, the GSM transmitter will be transmitting a GSM burst transmission 320).

In order to save power, a DVB-H receiver 180 goes to sleep mode between time slices 405. The time slices 405-1 to 405-5 contain the relevant data for the selected service. The transmission in DVB-H is generally always continuous, and the relevant content is only collected together (under one PID, program identifier) to enable a specific DVB-H receiver 180 to go to sleep mode. In the example of FIG. 4, the DVB-H receiver 180 receives Service 3.

Before the next relevant service, the DVB-H receiver 180 needs to wake up. The DVB-H receiver needs to wake up a little bit earlier before the burst (Service 3) is transmitted to have enough time for the synchronization process. This time is shown in FIG. 4 as acquisition period 410 of the time slices 405. A typical DVB-H receiver 180 has two modes: an acquisition mode (e.g., during acquisition period 410) to synchronize with the DVB-H signal in the DVB-H transmission 440; and a tracking mode (e.g., during tracking period 420), where the DVB-H signal in the DVB-H transmission 400 is tracked. Everything must be stabilized when the relevant data comes in the Service 3 time slot. The length of acquisition period 410 is dependent on receiver synchronization time (including stabilization of items such as an RF phase-locked loop, PLL, and automatic gain control, AGC).

FIG. 4 represents several possibilities for the GSM transmitter On/Off structure 450 to interfere with reception of the DVB-H receiver 180 during time slices 405. It should be noted that FIG. 4 is for illustration only and is not drawn to scale. For instance, a time slice 405 for DVB-H could last from several milliseconds to much longer time periods. By contrast, the active time for the GSM transmitter is less than one millisecond (see FIG. 3). Also, the timing relationship shown between the DVB-H receiver On/Off structure 440 and the GSM transmitter On/Off structure 450 is set up solely for ease of exposition and may not represent actual timing.

In the example of the active period 455-1, this active period 455-1 occurs during the tracking period 420 of the time slice 405-1. During the tracking period 420 of the time slice 405-1, the DVB-H receiver 180 is synchronized to and tracking the DVB-H transmission 400. Certain techniques dealing with countermeasures presented below reduce errors caused by the overlap of the active period 455-1 and the tracking period 420 of the time slice 405-1. In the example of active period 455-2, this active period 455-2 occurs during acquisition period 410 of the time slice 405-3. This overlap of active period 455-2 and the acquisition period 410 of time period 405-3 results in the possibility that the DVB-H receiver 180 will not synchronize at all with the DVB-H transmission 400 during the Service 3 portion of the DVB-H transmission 400. If the DVB-H receiver 180 does synchronize with the DVB-H transmission 400, there may be data lost because the acquisition period 410 may enter and override the tracking period 420 for the time slice 405-4.

As described in more detail below, the countermeasures described below may not provide a complete solution to the acquisition problem of overlap of active period 455-2 and acquisition period 410. In this case, one possibility is that if the acquisition process is not successful, the DVB-H receiver 180 could remain constantly in the active state during a GSM transmission (e.g., a phone call or other GSM transmission 310 comprising a number of GSM burst transmissions 320 in a burst structure, as shown in FIG. 3) or a portion thereof. There will be penalty in power consumption, but the synchronization (more accurately, synchronization acquisition) problems are avoided. Furthermore, in exemplary techniques below, the DVB-H receiver 180 is able to deduce timing of active states (e.g., active period 455-1) and inactive states 456 of the GSM transmitter 140. Thus, the DVB-H receiver 180 can leave the DVB-H receiver 180 in the active state, as indicated by line 406 or can preemptively enter the active state prior to the scheduled GSM active period 455-3 as shown by line 408. These steps would improve the possibility of synchronization acquisition for a period of potential overlap between the active period 455-3 and the acquisition period 410 of the time slice 405-5. By selectively increasing the time in the active state, the DVB-H receiver 180 will be in the tracking mode and will therefore already be synchronized with the DVB-H signal in the DVB-H transmission 400 when an interfering GSM burst transmission 320 occurs. In other words, based on predetermined knowledge of the GSM burst structure shown in FIG. 3, the DVB-H receiver 180 could determine when a burst transmission will interfere with DVB-H synchronization acquisition and ensure that the DVB-H receiver 180 is already in an active state prior to the possible interference with DVB-H synchronization acquisition.

Exemplary Embodiments

Figure 5:
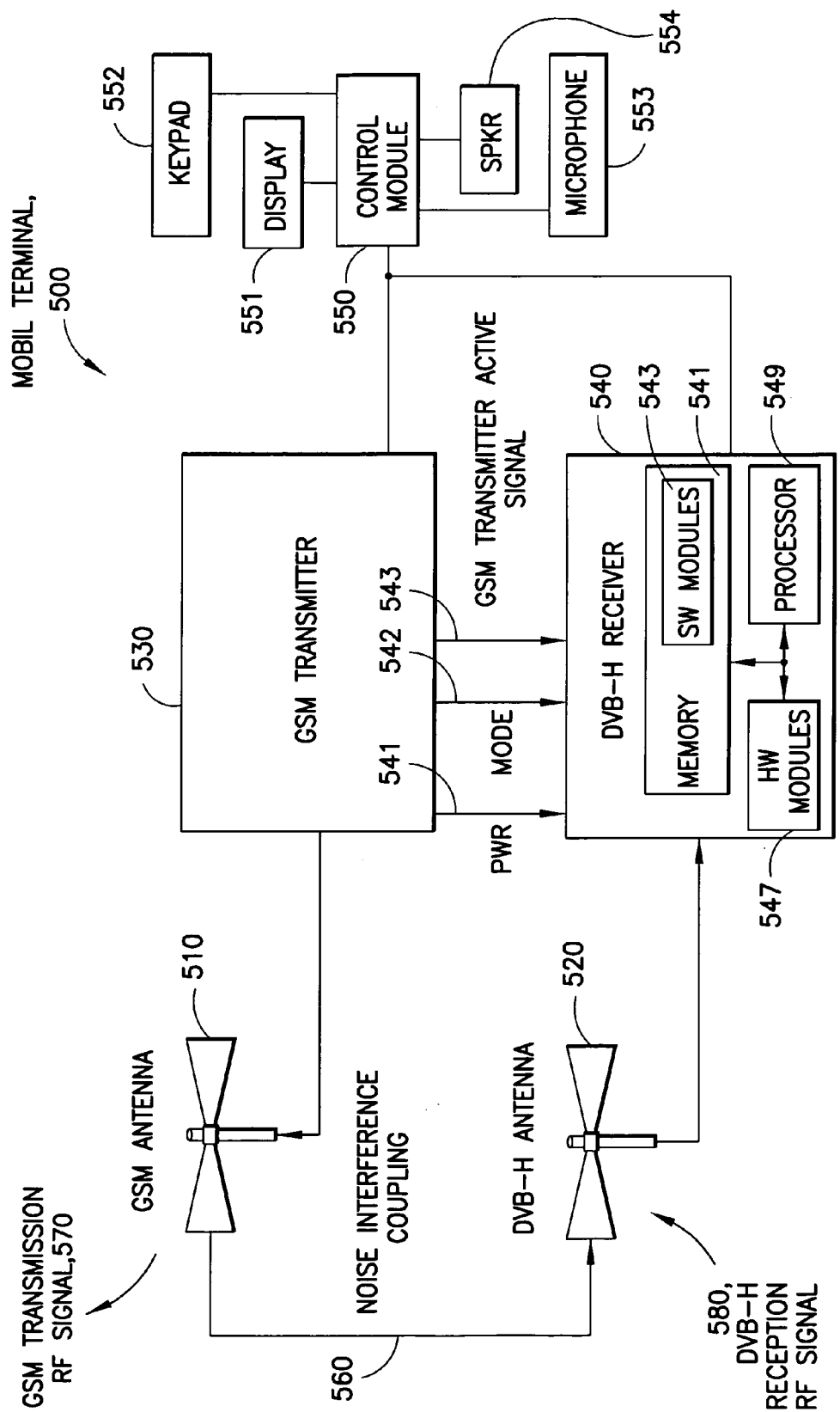
FIG. 5 is a block diagram of an exemplary mobile terminal.

Turning now to FIG. 5, a block diagram of an exemplary mobile terminal 500 is shown. Exemplary mobile terminal 500 comprises a GSM transmitter 530 that transmits using a GSM antenna 510, and a DVB-H receiver 540 that receives using the DVB-H antenna 520. A control module 550 controls the GSM transmitter 530 and the DVB-H receiver 540. The control module 550 accepts data from keypad 552 and microphone 553 and outputs data to the display 551 and the speaker 554. For instance, the display 551 can be used to display DVB-H data. The control module 550 will typically comprise a processor and memory (not shown) and software modules for controlling the mobile terminal 500.

The GSM transmitter 530 communicates with the DVB-H receiver 540 through a GSM transmitter active signal 543 and optionally through power (PWR) signal 541 and mode signal 542. The GSM transmitter active signal 543 indicates when the GSM transmitter 530 is actively transmitting a GSM burst transmission 320. Based on the GSM transmitter active signal 543, the DVB-H receiver 540 can determine timing of the active and inactive states of the GSM transmitter 530, as described above in reference to the GSM burst structure of FIG. 3 and the GSM transmitter On/Off structure 450 of FIG. 4. The GSM transmitter active signal 543 is any signal from which the DVB-H receiver 540 can determine that the GSM transmitter 530 is currently active (e.g., or will be active in the future). The GSM transmitter active signal 543 therefore is used to notify the DVB-H receiver 540 of a GSM burst transmission 320. Typically, the GSM transmitter active signal 543 is a binary signal with two states, one state indicating an active transmitter (e.g., a GSM burst transmission 320 is occurring or will be occurring within a predetermined time period) and one state indicating an inactive transmitter. The GSM transmitter active signal 543 could be a software signal such as the setting of a bit, or could be a signal indicating when in the future the GSM transmitter 530 will be active.

The power signal 541 and mode signal 542 are optional and one or both may be used. The power signal 541 is an indication of how much power is to be used during a GSM burst transmission 320. The mode 542 is an indication of what mode, typically either voice or data, e.g., general packet radio service (GPRS), is to be used for a GSM burst transmission 320. As described in reference to FIG. 8, one or both of these signals 541, 542 may be used to determine whether countermeasures are performed or how many countermeasures are performed in order to reduce interference between transmission of GSM and reception of DVB-H. The signals 541, 542 can be any signal suitable for indicating the power and mode, respectively, to the DVB-H receiver 540, such as binary signals over hardware traces or software signals. As an example, the power signal 541 could be a slow speed interaction channel, i.e., via software, to the DVB-H receiver 540, indicating the power level the GSM transmitter 530 is currently (e.g., or will be) using in the GSM burst transmission 320. In response to the power signal 541, the DVB-H receiver 540 could then adapt the countermeasures to be used. Illustratively, if the GSM transmission power level is very low, it may be more beneficial to use very few (e.g., or no) countermeasures.

The noise interference coupling 560 is, as described above, caused by a coupling of GSM transmission RF signal 570 (e.g., generated during an active state of the GSM transmitter 530) to the DVB-H antenna 520 while the DVB-H receiver 540 is attempting to receive the DVB-H reception RF signal 580.

As shown in the example of FIG. 5, the DVB-H receiver 540 is an integrated circuit having a memory 561 containing a number of software (SW) modules 563, a number of hardware (HW) modules 547, and a processor 549. The processor 549 is typically a digital signal processor (DSP), and there may be multiple processors. The memory 561 can be any read only or read-write memory, such as dynamic random access memory (DRAM), static random access memory (SRAM), and firmware. Exemplary division of functions between the hardware modules 547 and software modules 563 is described below in regard to FIGS. 6A and 6B. For instance, as described below, the DVB-H receiver 540 may comprise multiple integrated circuits.

Figure 6A:
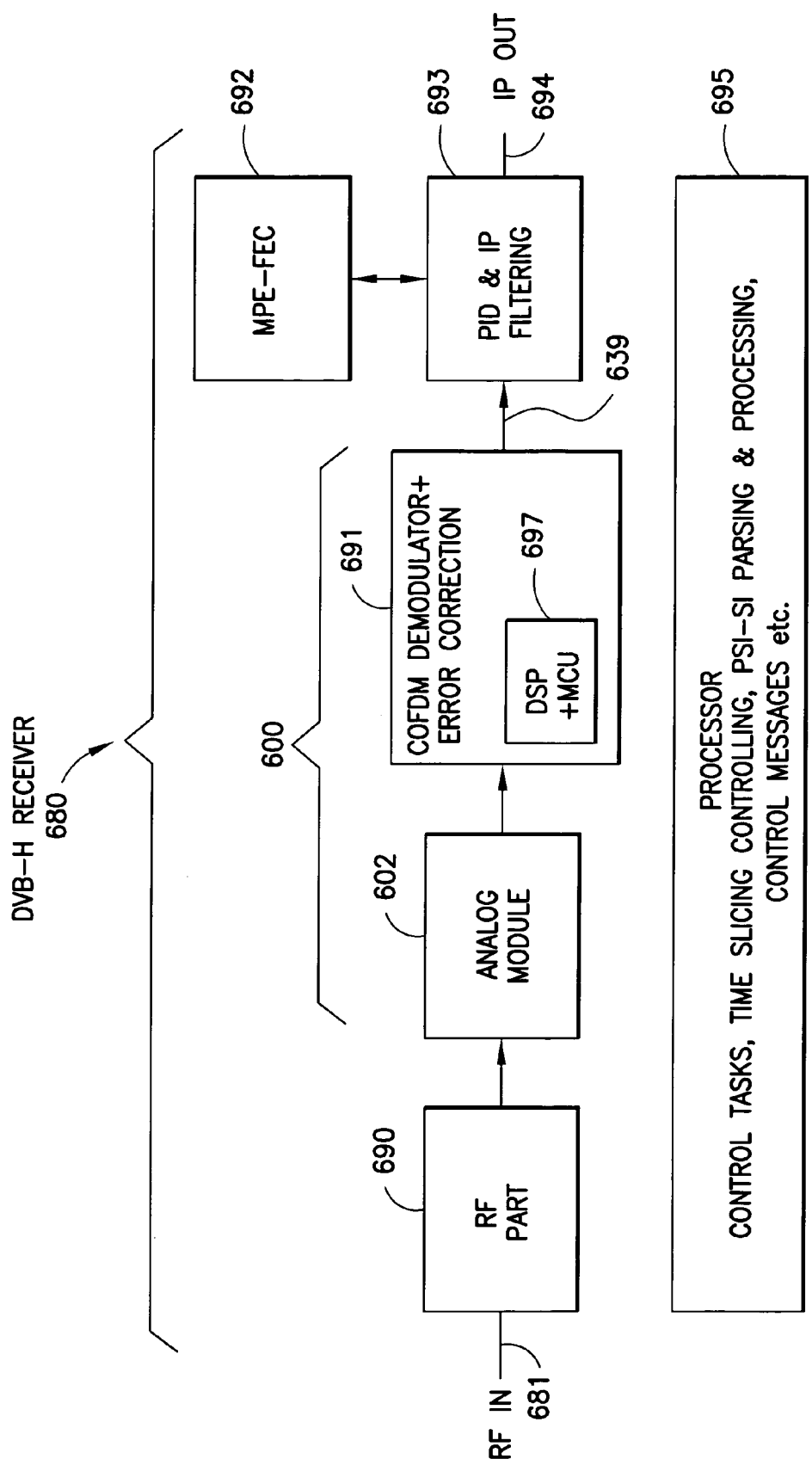
FIG. 6A is a block diagram of an exemplary DVB-H receiver.

Referring now to FIG. 6A, a block diagram is shown of an exemplary DVB-H receiver 680. DVB-H receiver 680 is a more extensive diagram of the DVB-H receiver 540. The DVB-H receiver 680 accepts RF in 681 (e.g., from DVB-H antenna 520) and produces internet protocol (IP) packets 694. The DVB-H receiver 680 comprises an RF part 690, an analog module 602, a coded orthogonal frequency division multiplexing (COFDM) demodulator and error correction module 691, multi-protocol encapsulation-forward error correction (MPE-FEC) module 692, and program identification (PID), IP filtering module 693, and processor 695. In the example of FIG. 6A, there are multiple processors 697 and 695. Processor 697 may comprise a DSP and a microcontrol unit (MCU). The processor 695 performs functions such as control tasks, time slicing controlling, program specific information-specific information (PSI-SI) parsing and processing, control messages, and other tasks. This is discussed in more detail below. The DVB-H portion 600 is shown in FIG. 6B.

Figures 1, 6B:
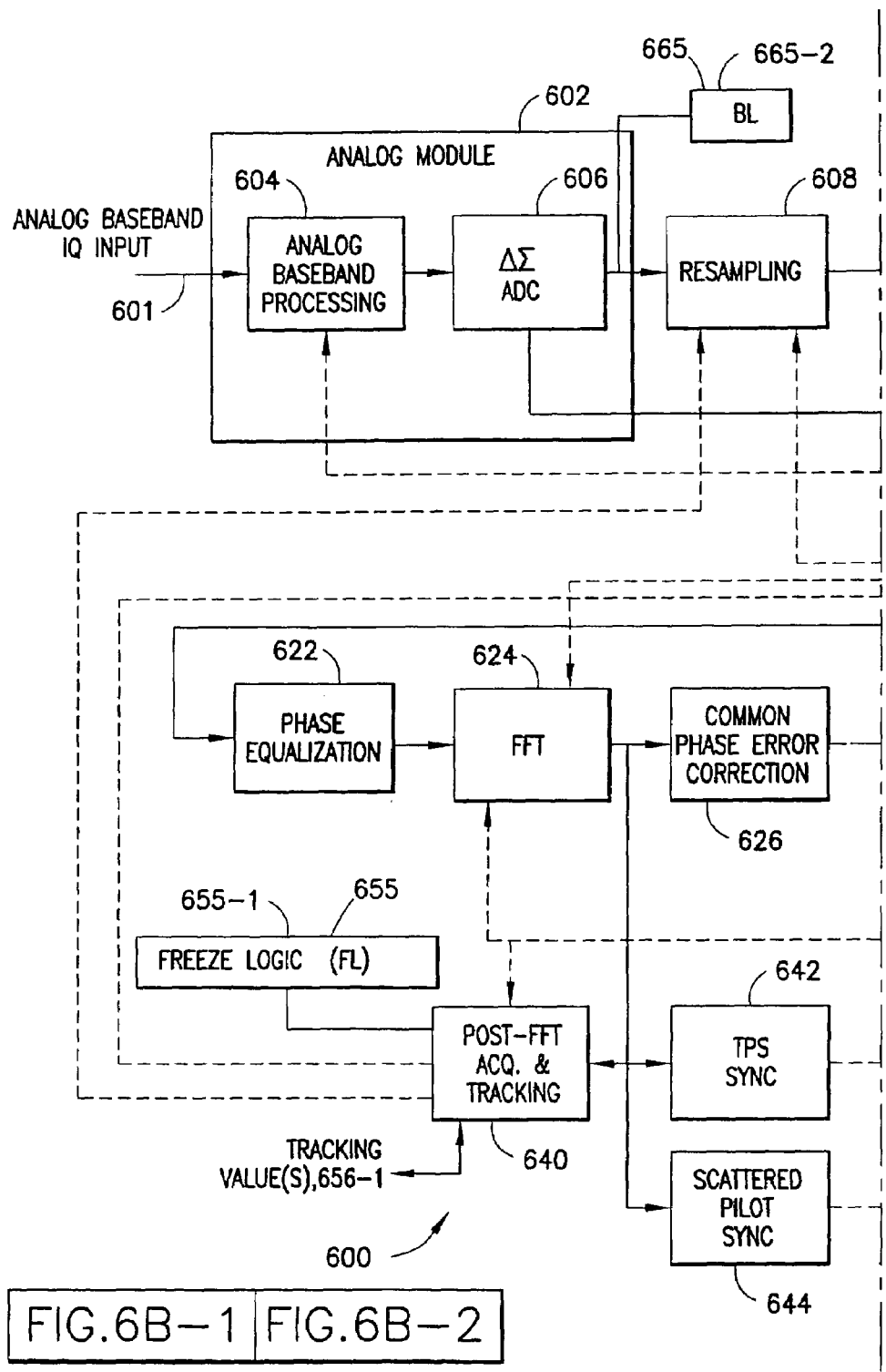
FIG. 6B is a block diagram of a portion of the exemplary DVB-H receiver shown in FIG. 6A.

FIG. 6B, shown as 6B-1 and 6B-2, is a block diagram of DVB-H portion 600 of the DVB-H receiver 680 of FIG. 6A. The DVB-H portion 600 accepts analog baseband IQ input signal 601, the power signal 541, the mode signal 542, and the GSM transmitter active signal 543. The DVB-H portion 600 produces a motion picture experts group (MPEG), transport stream (TS) 639. The DVB-H portion 600 comprises an analog module 602 (see FIG. 6A) and a COFDM demodulator and error correction module 691 (see FIG. 6A) that comprises the following: a resampling module 608, a balance and quadrature correction module 610, an AGO and bias control module 618, a frequency correction module 612, a channel low pass (LP) and decimation module 614, an impulse noise cancelling module 616, a pre-fast Fourier transform (FFT) acquisition module 620, a phase equalization module 622, an FFT module 624, a common phase error correction module 626, a channel estimation module 628, an equalization and softbit generation module 630, a deinterleaving module 632, a Viterbi decoding module 634, a Reed-Solomon decoding module 638, a fine-timing synchronization module 646, a post-FFT acquisition and tracking module 640, a transmission parameter signaling (TPS) synchronization module 642, and a scattered pilot synchronization module 644. The analog module 602 comprises an analog baseband processing module 604 and a delta-sigma analog-to-digital converter (ADC) module (606). A module performs some predetermined function(s), and a module may be implemented as hardware, software, or a combination of hardware and software. The analog baseband 10 input signal 601, the MPEG-TS 639, and the modules 602-644 are well known to those skilled in the art. For instance, see S. A. Fechtel et al., "Advanced Receiver Chip for Terrestrial Digital Video Broadcasting: Architecture and Performance," IEEE Transactions on Consumer Electronics, vol. 44, no. 3 (1998) and M. Speth et al., "Optimum Receiver Design for OFDM-Based Broadband Transmission—Part II: A Case Study," IEEE Transactions on Communications, vol. 49, no. 4 (2001).

Turning to FIGS. 5, 6A, and 6B, a DVB-H receiver 540, 680 is typically implemented as one or more integrated circuits. An integrated circuit for the DVB-H receiver 540, 680 usually (e.g., almost always) contains a processor 695 and/or digital signal processor (DSP) 697, which is a processor that has signal processing functionality. Thus in FIG. 5, there would be multiple processors 549. For example, in most implementations a synchronization state machine is controlled with a DSP 697 and related software (e.g., firmware)

module(s) (e.g., software modules 563 in memory 561 of FIG. 5). Actually, in most implementations, all synchronization (e.g., acquisition and tracking) modules are controlled by DSP 697, i.e., pre-FFT acquisition module 620, post-FFT acquisition and tracking module 640, and fine-timing synchronization module 646. The DSP 697 in practice controls almost all functions inside COFDM demodulator and error correction module 691.

In general, the most computation intensive operations (like FFTs in the FFT module 624) are implemented with hardware modules (e.g., hardware modules 547 in FIG. 5), but still the DSP 697 (e.g., acting as a state machine) controls the computationally intensive operations. In a sense, the hardware modules 547 are accelerators for the DSP 697. Link layer processing (e.g., time slicing, program specific information-specific information, PSI-SI, parsing) is usually done with some general processor 695, like ARM9 (a 32-bit reduced instruction set computer, RISC, processor) and related software modules (e.g., software modules 563 in memory 561).

In general, a DVB-H receiver 540, 680 comprises two high integration semiconductor chips, each of which contains one or more integrated circuits: One chip for the RF processing (e.g., analog domain chip) and one chip for the baseband processing (e.g., orthogonal frequency domain modulation, OFDM, demodulation, DSP, processor). Thus, the hardware modules 547, memory 561 and processor(s) 549, 697, and 695 of the DVB-H receivers 540, 680 could be split between two semiconductor chips. In some very advanced designs, these are combined into a single semiconductor chip implementation, as shown in FIG. 5.

Returning solely to FIG. 6B (with appropriate referral to FIGS. 5 and 6A), exemplary embodiments of the disclosed invention involve the control logic 650, the blanking algorithm module 660, the freeze logic 655, and the blanking logic 665. The control logic 650 can be implemented in software (e.g., firmware) executed on a processor and adapted to configure a processor to perform one or more operations described herein. The control logic 650 can also be implemented in hardware, or as some combination of hardware and software. Similarly, each of the blanking algorithm module 660, the freeze logic 655, and the blanking logic 665 can be implemented in software, hardware, or a combination of software and hardware.

The control logic 650 is responsive to a notification (e.g., the GSM transmitter active signal 543) from the GSM transmitter 530 (see FIG. 5) of a transmission in a predetermined transmission frequency band to cause at least one countermeasure to be performed by at least one of the modules in response to the notification, the at least one countermeasure predetermined to reduce effects of interference caused by the transmission on reception of the information in the reception frequency band.

For instance, certain exemplary countermeasures freeze loops having and being associated with modules in the DVB-H receiver 680 in order to freeze tracking of the DVB-H signal while (e.g., or around the time) the GSM transmitter 530 is transmitting GSM burst transmission 320. A loop contains feedback or feed-forward or both, and a loop is used to track a DVB-H signal (e.g., DVB-H reception RF signal 580). Freezing a loop entails keeping the loop in state prior to the GSM burst transmission 320 (e.g., such that the loop does not track the DVB-H signal), and unfreezing the loop entails allowing the loop to begin tracking the DVB-H signal again. Illustratively, the AGC loop, which includes the AGC and bias control module 618 and the feedback to the analog baseband processing module 604, is generally frozen. To freeze the AGC loop, the AGC value(s) 656-2 associated with the AGC and bias control module 618 are frozen (e.g., kept at the value(s) prior to the notification of the GSM burst transmission 320). The freeze logic 655-2 is coupled and responsive to the control logic 650 and performs the functions of freezing and unfreezing the AGC value(s) 656-2. The freeze logic 655-2 may reside in part of the AGC and bias control module 618 or reside separately from the AGC and bias control module 618.

Another loop that may be frozen is a synchronization loop, which includes as a first portion the pre-FFT acquisition module 620 and the corresponding feedback to the resampling module 608, the frequency correction module 612, and the FFT module 624. This first portion of the synchronization loop may be frozen by freezing the tracking value(s) 656-3 associated with the pre-FFT acquisition module 620. The freeze logic 655-3 is coupled and responsive to the control logic 650 and performs the actions of freezing and unfreezing the tracking value(s) 656-3. The freeze logic 655-3 may reside in part of the pre-FFT acquisition module 620 or reside separately from the pre-FFT acquisition module 620. A second portion of the synchronization loop includes the post-FFT acquisition and tracking module 640 and the corresponding feedback to the resampling module 608 and the frequency correction module 612. This second portion may be frozen by freezing the tracking value(s) 656-1 associated with the post-FFT acquisition and tracking module 640. The freeze logic 655-1 is coupled and responsive to the control logic 650 and performs the actions of freezing and unfreezing the tracking value(s) 656-1. The freeze logic 655-1 may reside in part of the post-FFT acquisition and tracking module 640 or reside separately from the post-FFT acquisition and tracking module 640.

It is noted that each of the tracking values 656-3 and 656-1 typically comprise frequency and sampling values. This is true because the pre-FFT acquisition module 620 and the post-FFT acquisition and tracking module 640 both have feedback to the resampling module 608 and the frequency correction module 612. Generally, the pre-FFT acquisition module 620 runs first and then the post-FFT acquisition and tracking module 640 will run.

Another countermeasure that can be performed is discarding channel estimation data 671 associated with the channel estimation module 628 during the GSM burst transmission 320. The discard logic 670 is coupled and responsive to the control logic 650 to cause the channel estimation data 671 to be discarded and to restart use of the channel estimation data 671. The discard logic 670 could be a part of the channel estimation module 628 or could be separate from the channel estimation module 628. The channel estimation data 671 can include, e.g., channel estimation pilots.

Another countermeasure that can be performed is to use a blanking algorithm, such as used in blanking algorithm module 660, which is coupled and responsive to the control logic 650. The received information during GSM burst can be blanked (e.g., zeroed or marked unreliable or both) according to the known blanking (e.g., cancellation) algorithms. The blanking may be performed for individual COFDM sub carriers (e.g., removing some carriers) or it may be performed for a limited number of ADC output samples (e.g., setting some samples to zero). These are the most common examples of blanking, but other examples such as marking data as unreliable may be used. It should be noted that blanking could include marking received information as unreliable. Blanking is described, e.g., in European patent application EP1043874, "Detection and Removal of Clipping in Multicarrier Receivers, filed Apr. 7, 2000, and P.C.T. patent application WO03/

073683, "Method and System for Receiving a Multi-Carrier Signal," published on Sep. 4, 2003.

The blanking can occur at a number of locations. Blanking may be performed after the frequency correction module 612 and after the impulse noise canceling module 616. The blanking logic 665-3 and 665-4, respectively, perform these blanking actions under direction of the blanking algorithm module 660. The blanking logic 665-3 and 665-4 are coupled and responsive to the blanking algorithm module 660. The blanking may also occur directly after the delta-sigma ADC module 606 and in the equalization and softbit generation module 630. The blanking logic 665-2 and 665-1, respectively, perform these blanking actions under direction of the blanking algorithm module 660. The blanking logic 665-2 and 665-1 are coupled and responsive to the blanking algorithm module 660.

Although one countermeasure may reduce interference in the reception of the DVB-H signal caused by the transmission of the GSM signal, typically more than one or all of the countermeasures are used. However, as described below, whether countermeasures are used or how many countermeasures are used can be determined using the power signal 541 and mode signal 542. Additionally, different techniques may be used to help the synchronization acquisition problem.

Figure 7:
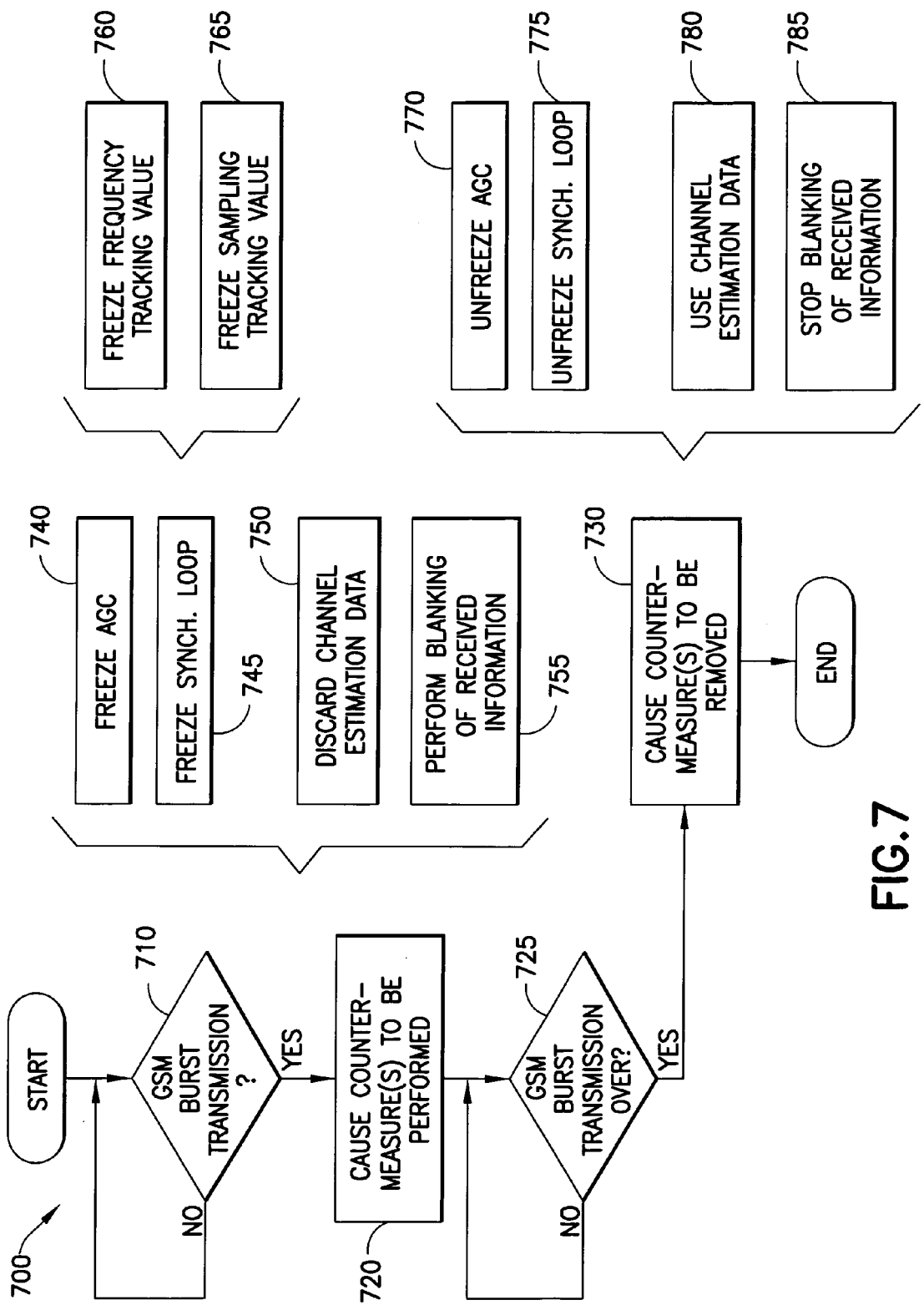
FIG. 7 is a flow chart of an exemplary method for improving interoperability between transmitters and receivers in a mobile terminal.

Turning to FIG. 7 with appropriate reference to FIGS. 6A and 6B, FIG. 7 shows a flow chart of an exemplary method 700 for improving interoperability between transmitters and receivers in a mobile terminal. Method 700 is performed, e.g., by the control logic 650. Method 700 is performed if there are no problems with synchronization during an acquisition mode of a DVB-H receiver. The method 800 shown in FIG. 8 may be performed if there are synchronization problems caused by overlap of a GSM burst transmission 320 and an acquisition mode of a DVB-H receiver.

The method 700 begins in step 710. In step 710, the control logic 650 waits (step 710=NO) for a GSM burst transmission 320. If there is a GSM burst transmission 320 (step 710=YES), step 720 is performed. The control logic 650 is notified of the GSM burst transmission 320 by the GSM transmitter active signal 543. In response to the notification, the control logic 650 causes one or more countermeasures to be performed. This occurs in step 720. Exemplary countermeasures include the following: freezing the AGC in step 740, which may be performed by freezing the AGC value(s) 656-2; freezing the synchronization loop in step 745, which may be performed by freezing one or both of the tracking value(s) 656-3 (step 760) and the tracking value(s) 656-1 (step 765); discarding channel estimation data 671 in step 750; and performing blanking of received information in step 755. Freezing a value is typically performed by using the last value prior to the GSM burst transmission.

The countermeasures are performed until the GSM burst transmission 320 is complete. For instance, if the GSM burst transmission is not complete (step 725=NO), the countermeasures are continued to be performed. If the GSM burst transmission 320 is complete (step 725=YES), the countermeasures are removed (step 730). In step 730, the control logic 650 causes the countermeasures to be removed (e.g., stopped). For instance, the AGC can be unfrozen (step 770), which can be performed by allowing the AGC value(s) 656-2 to be updated; the synchronization loop can be unfrozen (step 775), which can be performed by allowing the tracking value (s) 656-3 and the tracking value(s) 656-1 to be updated; the channel estimation data 780 can be used again (step 780); and the blanking of received information can be stopped (step 785). The method 700 ends after step 730.

Figure 8:
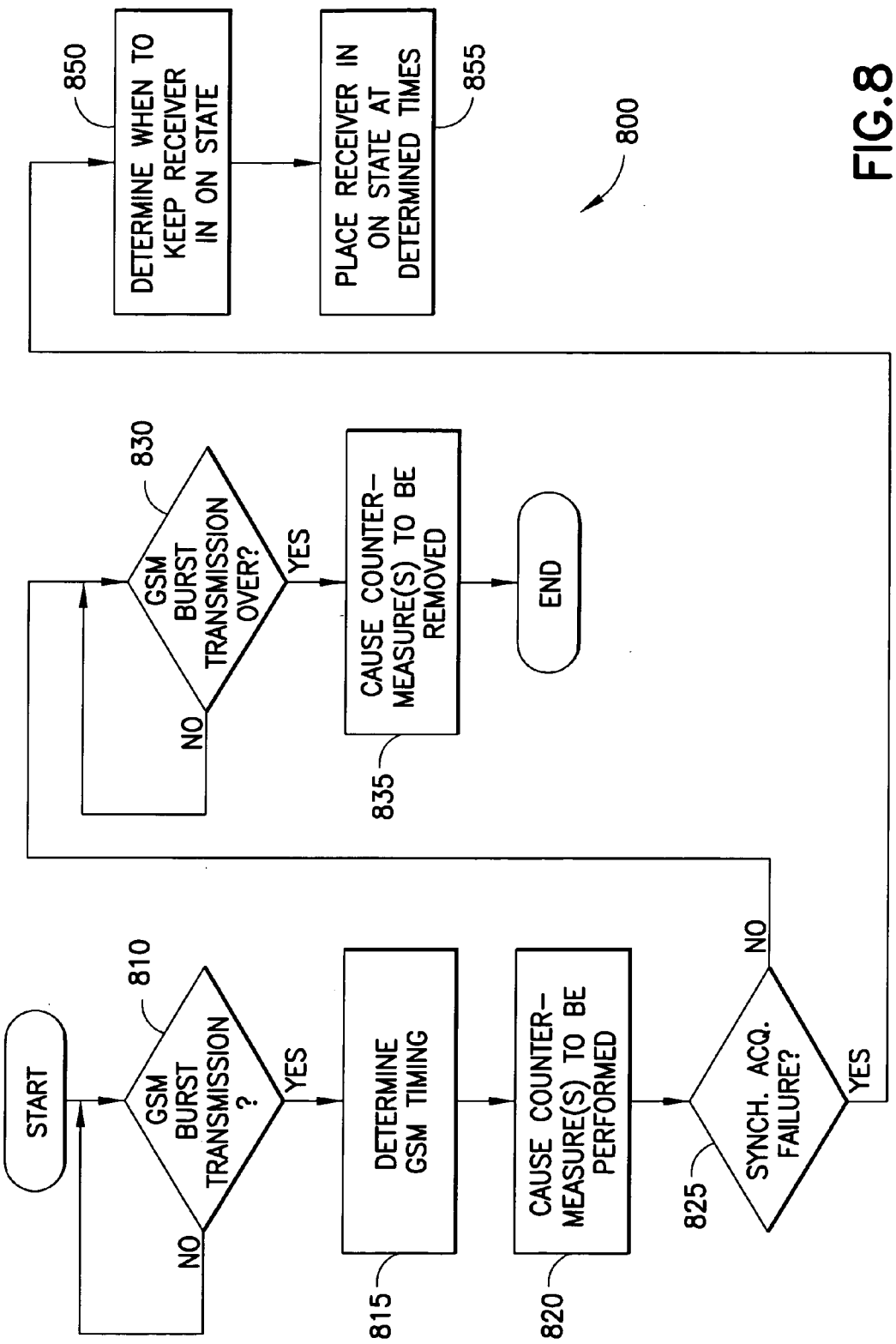
FIG. 8 is a flow chart of another exemplary method for improving interoperability, in particular for acquisition of a DVB-H signal while a GSM transmission is occurring, between transmitters and receivers in a mobile terminal.

As discussed above in reference to FIG. 4, the acquisition mode of a DVB-H receiver may be affected by the GSM burst transmissions 320. If a GSM burst transmission 320 occurs during an acquisition mode of the DVB-H receiver, the acquisition might fail. FIG. 8 is a flow chart of another exemplary method 800 for improving interoperability between transmitters and receivers in a mobile terminal. Method 800 is used when problems with acquisition occur for the DVB-H receiver. Method 800 is typically performed by control logic 650.

Method 800 begins in step 810. Method 800 assumes that the GSM burst transmission 320 occurs during acquisition mode of the DVB-H receiver. In step 810, it is determined if there is a GSM burst transmission 320. If not (step 810=NO), the method 800 continues in step 810. If there is a GSM burst transmission 320 (step 810=YES), step 815 is performed in response. The control logic 650 is notified of the GSM burst transmission 320 by the GSM transmitter active signal 543. In response to the notification, the control logic 650 determines the GSM timing in step 815. For instance, the control logic 650 can determine the GSM burst structure shown in FIG. 3. The control logic 650 then causes one or more countermeasures to be performed. This occurs in step 820. Exemplary countermeasures include the following: freezing the AGC in (see step 740 of FIG. 7); freezing the synchronization loop (see step 745 of FIG. 7); and discarding channel estimation data (see step 750 of FIG. 7). Step 755 of FIG. 7 would not be performed, as there would be no received information until after the acquisition mode is complete (e.g., the DVB-H receiver would be in tracking mode once acquisition is complete).

In step 825, it is determined if there is a current (e.g., or previous) synchronization acquisition failure. It should be noted that synchronization of the DVB-H receiver to a DVB-H RF signal occurs in both the acquisition mode and the tracking mode of the DVB-H receiver. If there is no synchronization acquisition failure (step 825=NO), then the control logic 650 would wait (step 830=NO) until the GSM burst transmission 320 is over (step 830=YES) and then cause countermeasure(s) to be removed in step 835. The method 800 would then end.

If there is (e.g., or has previously been) a synchronization acquisition failure (step 825=YES), the control logic 650 would then, using the GSM timing determined in step 815, determine when to keep the DVB-H receiver in the active (e.g., "on") state. This occurs in step 850. As described above in reference to FIG. 4, the DVB-H receiver could be placed in the active state (step 855) until the GSM transmission 310 has ended (e.g., see line 406 of FIG. 4). Determining that the GSM transmission 310 has ended could be performed by using a software interaction bus (e.g., between the DVB-H receiver 540 and the control module 550) to inform the DVB-H receiver that the GSM transmission 310 has ended. The GSM side (e.g., of the control module 550) has this information available in the system software. Any suitable technique may be used to inform the DVB-H receiver that the GSM transmission 310 has ended. Note that in this exemplary embodiment, the DVB-H receiver would be placed in an active state for the remaining portion of the GSM transmission 310 (see FIG. 3), which typically includes multiple GSM burst transmissions 320 and may include DTX periods where the GSM burst structure in FIG. 3 is less regular than what is shown in FIG. 3. For instance, in FIG. 3, the GSM burst transmissions 320 may occur only every several frames 330 instead of every frame 330 as shown in FIG. 3.

In another exemplary embodiment, the DVB-H receiver could also be placed in the active state prior to when each GSM burst transmission 320 is expected. See for example, line 408 of FIG. 4. This would be performed on a burst-by-burst decision process. For instance, the DVB-H receiver would be placed in the active mode prior to the active periods 455-2 and 455-3 of FIG. 4 (see FIG. 4 and related description above).

It should be noted that when method 800 is modified so that any previous or current failure of synchronization acquisition would cause the DVB-H receiver to enter the active state for the duration of the GSM transmission 310 (e.g., phone call), step 815 would generally be skipped.

Thus, FIG. 8 shows that synchronization during acquisition can be improved. There would be greater power usage as compared to typical time-slicing DVB-H reception when using method 800, but the reception of the DVB-H signal would be improved.

Figure 9:
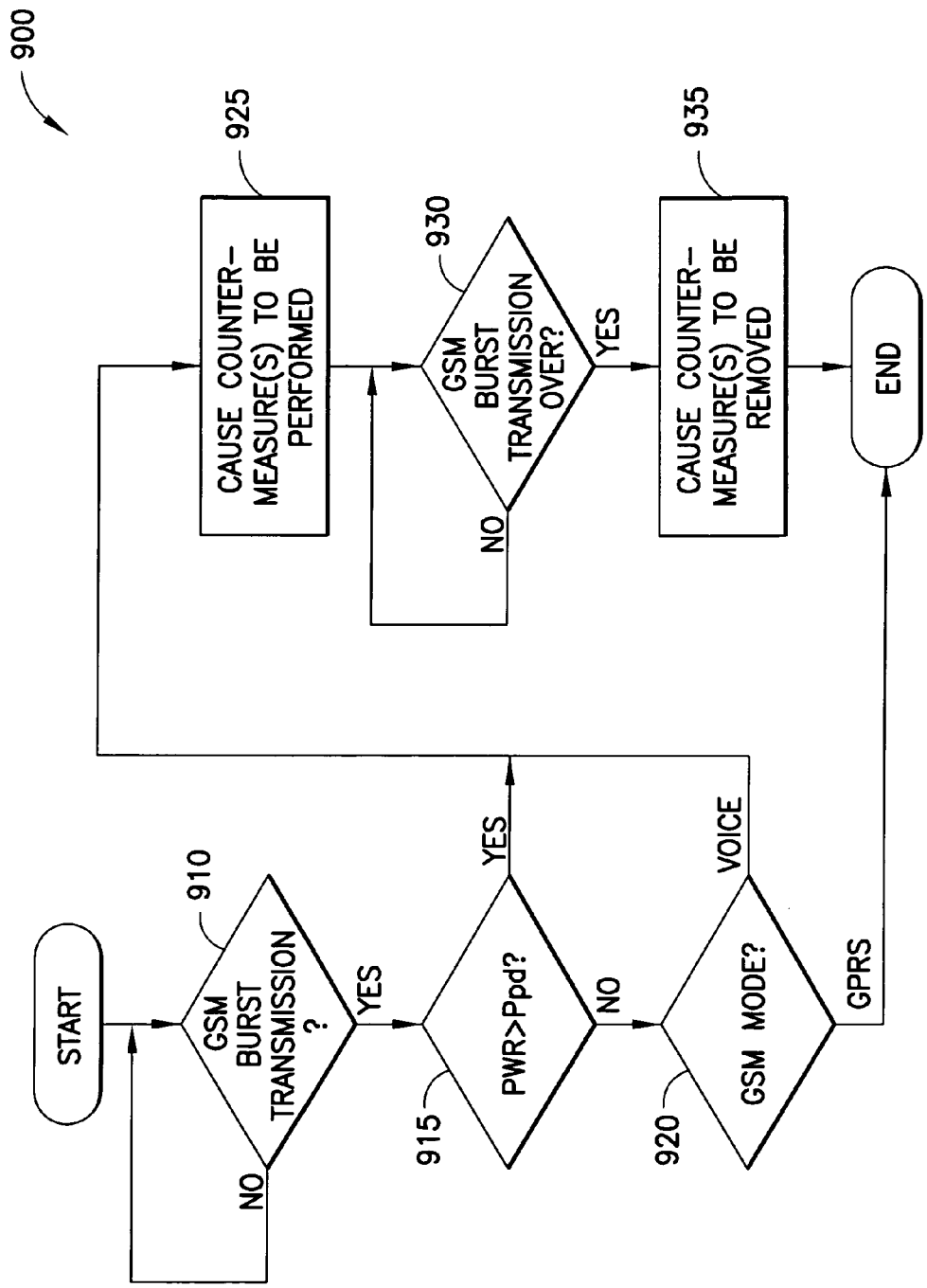
FIG. 9 is a flow chart of another exemplary method for improving interoperability, specifically using one criterion or multiple criteria in addition to an interfering transmission, between transmitters and receivers in a mobile terminal.

Turning now to FIG. 9, a flowchart is shown of an exemplary method 900 for improving interoperability, specifically using one criterion or multiple criteria, between transmitters and receivers in a mobile terminal. In FIGS. 7 and 8, it was assumed that the sole criterion for determining whether countermeasure(s) should be performed was GSM transmission 310 or GSM burst transmission 320 during a DVB-H reception. In method 900, additional criteria are used to determine whether and to what extent countermeasure(s) should be performed during a DVB-H reception. Method 900 is similar to method 700 and assumes synchronization acquisition is not affected by a GSM burst transmission 320.

Method 900 starts in step 910. In step 910, it is determined if there is a GSM burst transmission 320. If not (step 910=NO), the method 900 continues in step 910. If there is a GSM burst transmission 320 (step 910=YES), step 915 is performed. In step 915, it is determined if the GSM transmission power (PWR) (determined using power signal 541) is greater than a previously determined power (Ppd). The Ppd could be a programmable parameter that is programmed into non-volatile memory of certain mobile terminals based on laboratory measurements with different power level thresholds.

If PWR is greater than Ppd (step 920=YES), the method 900 continues in step 925. If PWR is smaller than or equal to Ppd (step 920=NO), the method 900 continues in step 920. In step 920, it is determined what the GSM mode (e.g., using mode signal 542) is for the current GSM burst transmission 320. The GSM mode in this example is either voice or data (i.e., GPRS in this example). GSM burst transmission of voice could cause more errors in DVB-H reception than would a GSM burst transmission of GPRS. If more errors are caused in voice than GPRS transmission, then countermeasures are performed (step 925) for voice (step 920=VOICE), while no countermeasures (method 900 ends) are performed for GPRS (step 920=GPRS).

In step 925, one or more countermeasures are performed. For instance, see the description above of steps 720 and 820. It should be noted that step 925 could have an aspect related to the criteria of PWR and GSM mode. For instance, if PWR>P1, all countermeasures will be used. If PWR>P2 (where P1>P2), only selected ones of the countermeasures are performed. For instance, perhaps blanking of received information would not be performed. Similarly, if PWR>P1 and GSM mode=voice, different countermeasures could be used than if PWR>P2 and GSM mode=voice.

The control logic 650 waits (step 930=NO) until the GSM burst transmission 320 is over (step 930=YES) and then causes countermeasure(s) to be removed in step 935. The method 900 would then end. It should be noted that since the power and the mode will typically occur for the entire GSM transmission 310, notification of a GSM transmission 310 can be used instead of (or in addition to) the notification for the GSM burst transmission 320.

Note that method 900 can be modified to solely rely on PWR (e.g., no step 920), to solely relay on GSM mode (e.g., no step 915), and to execute different steps 925 with different countermeasure(s) based on combinations of PWR and GSM mode (including GPRS). The method shown in FIG. 9 is merely exemplary.

Additionally, one or more of steps 915 and 920 may be applied to method 800 of FIG. 8. For example, if high GSM transmission power (PWR) causes synchronization errors but low PWR does not, step 915 could be added to method 800. Similarly, if GPRS causes more synchronization errors than does voice (or vice versa), step 920 could be added to method 800.

Figure 10:
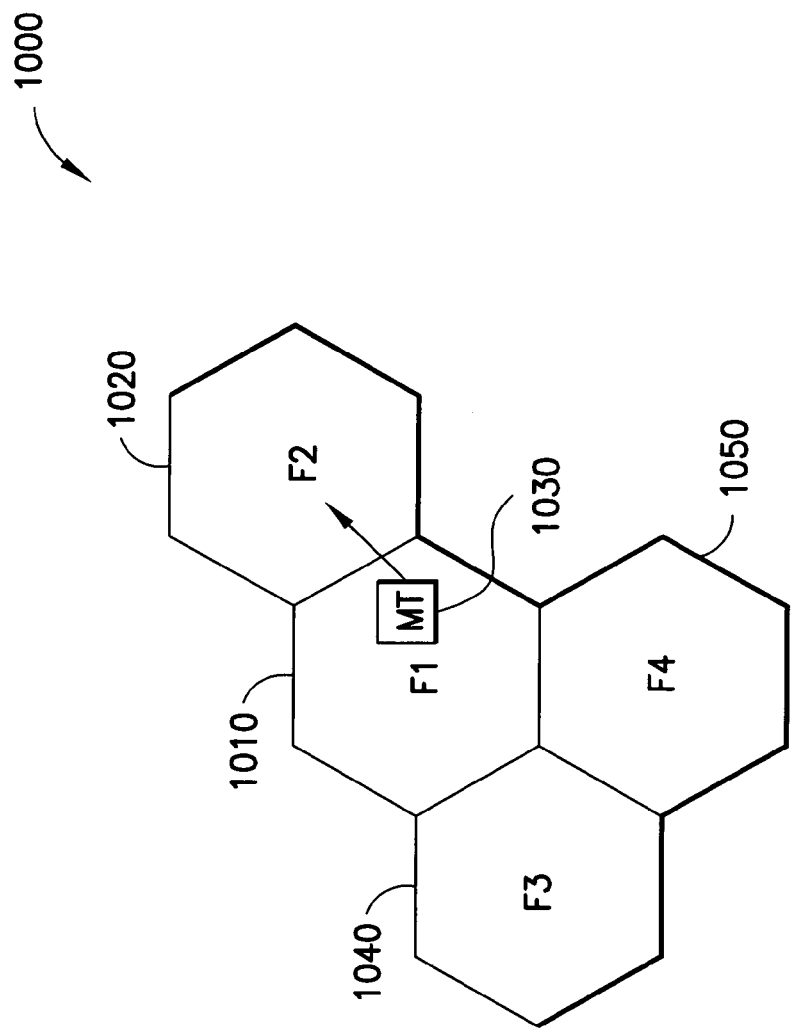
FIG. 10 is a diagram of a cellular structure and an associated handover of a mobile terminal between two of the cells in the cellular structure.
Figure 11:
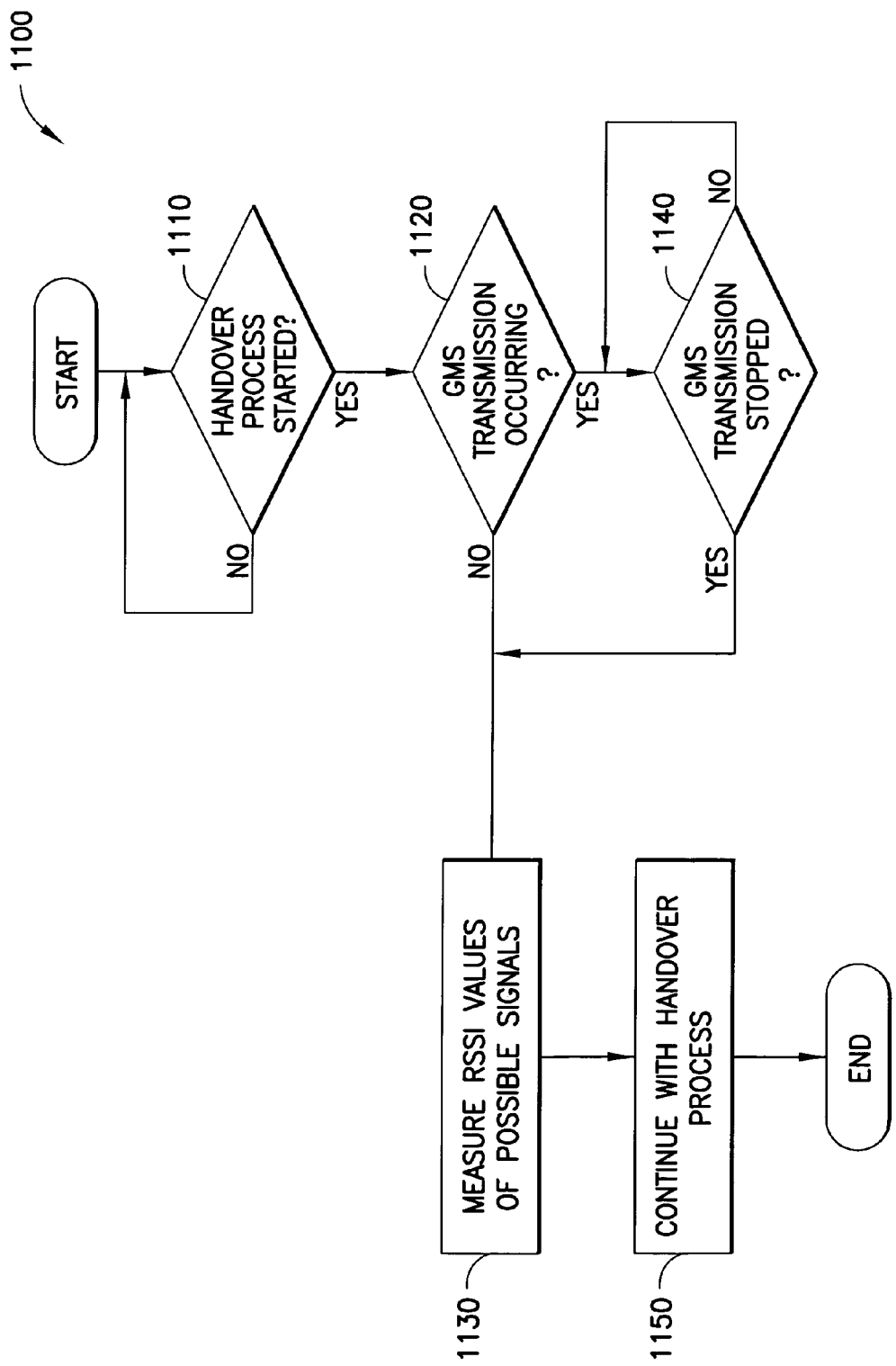
FIG. 11 is a flowchart of a method for improving the handover process for mobile terminals having both a GSM transmitter and a DVB-H receiver.

Another exemplary problem with DVB-H reception during a GSM transmission 310 (e.g., and a GSM burst transmission 320) is illustrated in FIGS. 10 and 11. In particular, problems with handover of a mobile terminal between cells are described.

Turning now to FIG. 10, a diagram is shown of a DVB-H cellular structure 1000 and an associated handover of a mobile terminal 1030 between two of the DVB-H cells 1010 and 1020 in the DVB-H cellular structure 1000. The mobile terminal 1030 is moving from DVB-H cell 1010 to DVB-H cell 1020. Although not shown in FIG. 10, the mobile terminal 1030 has a GSM transmitter and a DVB-H receiver.

Figures 2, 6B:
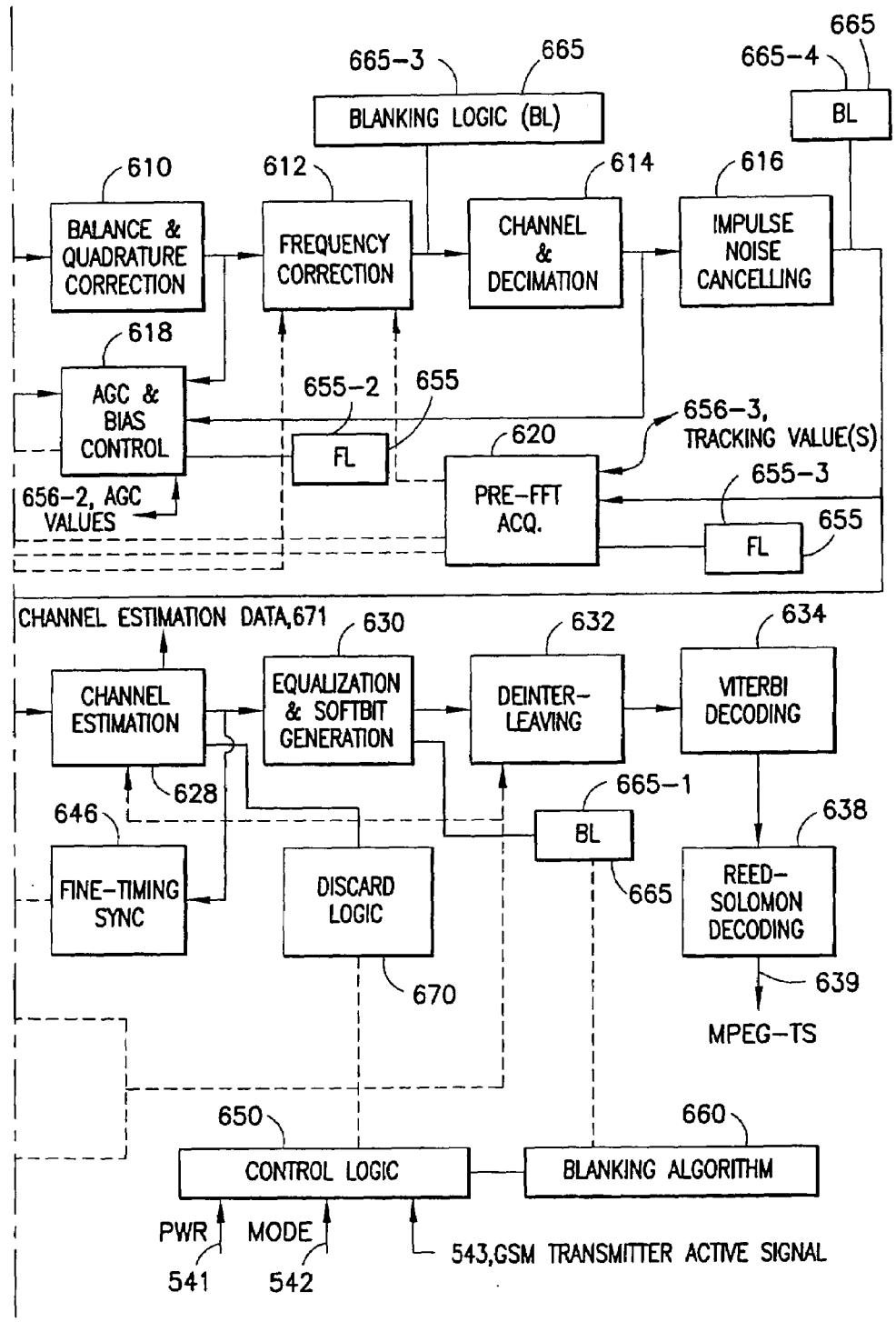

When the DVB-H receiver in the mobile terminal 1030 moves close to the border of the DVB-H cell 1010, the DVB-H receiver has to start a process for cell handover, e.g., changing the reception frequency to the next cell 1020. For example, moving from DVB-H cell 1010 (i.e., using frequency F1) to DVB-H cell 1020 (i.e., using frequency F2). Before making the actual handover the DVB-H receiver has to monitor the signal strength of the neighboring DVB-H cells, such as DVB-H cells 1020, 1040, and 1050, to be able to decide which is the best candidate cell and where to perform the handover (e.g., the DVB-H receiver does not have location data available). The handover process is performed by measuring receiver signal strength indicator (RSSI) of signals for each of the DVB-H cells that can communicated with the DVB-H receiver. The RSSI is derived from the AGC loop (see discussion above in reference to FIG. 6). These measurements take a long time and are performed during the time slicing OFF period (e.g., inactive state) for the DVB-H receiver. DVB-H soft handover for mobile terminals is discussed by Jani Väre and Matti Puputti, "Soft Handover in Terrestrial Broadcast Networks," Mobile Data Management, Berkeley, Calif. (2004).

The problem is that if the RSSI measurements are taken during the GSM transmission 310, there is a high probability that one or more measured RSSI values will not be correct, because the DVB-H signal strength is masked by the GSM signal and associated noise. The RSSI values used as input for the handover algorithm may therefore not be correct, which could yield an incorrect handover and data loss.

FIG. 11 is a flowchart of a method 1100 for improving the handover process for mobile terminals having both a GSM transmitter and a DVB-H receiver. Method 11 would be performed, e.g., by control logic 650. Method 1100 begins in step 1110, when it is determined if the handover process has started. Typically, a handover process is begun when the RSSI of the current DVB-H cell has reached a predetermined value. If a handover process has not started (step 1110=NO), the method 1100 waits in step 1110. If a handover process has started (step 1110=YES), it is determined if a GSM transmission 310 is occurring in step 1120. A GSM transmission 310 could be determined as occurring by determining that a GSM burst transmission 320 occurred within a predetermined time period or by using a software interaction bus (e.g., between the DVB-H receiver 540 and the control module 550) to inform the DVB-H receiver that the GSM transmission 310 has begun. As described above in reference to step 855, the GSM side (e.g., of the control module 550) has this information available in the system software. Any suitable technique may be used to inform the DVB-H receiver that the GSM transmission 310 has begun or is currently occurring.

If a GSM transmission 310 is not occurring (step 1120=NO), then the RSSI values of possible signals (e.g., of DVB-H cells 1020, 1040, and 1050 in FIG. 10) are measured in step 1130. By contrast, if a GSM transmission 310 is currently occurring (step 1120=YES), then step 1140 is performed to wait for the end of the GSM transmission 310. If the GSM transmission 310 is not stopped (step 1140=NO), the method 1100 continues in step 1140. If the GSM transmission 310 is stopped (step 1140=YES), then the RSSI values of possible signals (e.g., of DVB-H cells 1020, 1040, and 1050 in FIG. 10) are measured in step 1130.

After the RSSI values are determined in step 1130, the handover process is continued in step 1150. For instance, a valid DVB-H cell (e.g., DVB-H cell 1120) will be determined and the actual handover will be performed. The method 1100 ends after step 1150.

Typically, the RSSI value determination takes longer than the time period between two GSM burst transmissions 320. Thus, measurement of RSSI values are delayed until after the GSM transmission 310 (which includes multiple GSM burst transmissions 320) ends in method 1100. However, it might possible to measure RSSI values in time periods when there are few GSM burst transmission 320 (e.g., a long time between transmission of DTX data). Thus, measurement of RSSI values could be delayed until after the GSM burst transmission 320 ends in method 1100.

Exemplary embodiments of the present invention have been described thus far in terms of specific examples of frequency bands and the like. However, it should be kept in mind that these teachings can be applied to other frequency bands, such as the frequency bands of 1850-1910 MHz that are allocated in the United States for GSM and 1670-1675 MHz that are allocated in the United States for DVB-H broadcasts, and to other the cellular transmission bands such as those produced by TDMA and/or CDMA cellular systems. It should also be noted that some terminal devices contain multiple transmitters, but some transmitters may not interfere to any degree with reception in a particular frequency band. In this case, a determination may be made as to which frequency band is being transmitted on and the countermeasures applied in response to notification that a particular frequency band is being transmitted.

Also, while the above disclosure of the presently preferred embodiments has concentrated on the use of the DVB-H and GSM systems, those skilled in the art should realize that these should not be read as limitations on the practice of this invention, and that other types of communications systems using the same or different frequency bands may also benefit from the use of this invention.

In general, the various embodiments of the mobile terminal 500 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by a data processor of the mobile terminal 500, such as the processor 549, or by hardware, or by a combination of software and hardware. Further in this regard it should be noted that the various blocks of the logic flow diagram of FIGS. 7-9 might represent program steps, or interconnected logic circuits, blocks and functions, or a combination of program steps and logic circuits, blocks, and functions. Logic circuits, blocks, and functions are examples of hardware.

The memory 561 (and any other memory such as that in control module 550) may be of any type suitable to the local technical environment and may be implemented using any suitable data storage technology, such as semiconductor-based memory devices, magnetic memory devices and systems, optical memory devices and systems, fixed memory and removable memory.

Embodiments of the invention may be practiced in various components such as integrated circuits. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. An apparatus comprising:
a plurality of included modules; and
a control logic module configured, responsive to receiving a first notification of a transmission in a predetermined frequency band, to cause at least one countermeasure to be performed by at least one of the plurality of included modules, the at least one countermeasure predetermined to reduce an effect of interference caused by the transmission on reception of information in a reception frequency band;
wherein the transmission is one burst transmission of a plurality of burst transmissions, wherein the control logic module is further configured to determine whether to cause the at least one countermeasure to be performed for the burst transmission responsive to a second notification of which of a plurality of modes is used in the burst transmission.

2. The apparatus of claim 1, wherein the apparatus comprises at least one integrated circuit, the at least one integrated circuit comprising at least one processor, a memory, and the plurality of included modules, wherein given ones of the plurality of included modules are implemented using at least one of a software module executable by the at least one processor and at least one hardware module.

3. The apparatus of claim 1, further comprising: a receiver configured to receive the information in the reception frequency band.

4. The apparatus of claim 3, further comprising a first antenna coupled to the receiver, a transmitter and a second antenna coupled to the transmitter.

5. The apparatus of claim 1, wherein the predetermined frequency band comprises a frequency band defined by a global system for mobile communications (GSM) standard and the reception frequency band comprises a reception frequency band defined by a digital video broadcasting for handhelds (DVB-H) standard.

6. The apparatus of claim 1, wherein the plurality of burst transmissions have a burst structure, and wherein the control logic module is further adapted to determine timing of the burst transmission based on predetermined knowledge of the burst structure.

7. The apparatus of claim 6, wherein the at least one countermeasure comprises placing a receiver of the apparatus in an active state prior to a beginning of the burst transmission.

8. The apparatus of claim 7, wherein the at least one countermeasure comprises placing the receiver in the active state prior to the beginning of the burst transmission in response to a previous synchronization acquisition failure that occurred when a previous burst transmission and an acquisition mode of the receiver at least partially overlapped in time.

9. The apparatus of claim 7, wherein the at least one countermeasure comprises placing the receiver in the active state prior to the beginning of the burst transmission and continuing the active state until the burst transmission is determined to be stopped.

10. The apparatus of claim 1, wherein the at least one countermeasure comprises freezing an automatic gain control loop for at least a duration of the transmission.

11. The apparatus of claim 10, wherein the plurality of included modules comprises an automatic gain control module and wherein the control logic module is further adapted to freeze at least one automatic gain control value associated with the automatic gain control module.

12. The apparatus of claim 10, wherein the plurality of included modules comprises a freeze logic module coupled to the automatic gain control loop and to the control logic module, the freeze logic module responsive to the control logic module and adapted to freeze and unfreeze the automatic gain control loop.

13. The apparatus of claim 10, wherein the at least one countermeasure further comprises at least one of the following:
  causing a synchronization loop to be frozen for at least a duration of the transmission;
  causing a channel estimation module to discard channel estimation data for at least a duration of the transmission; and
  causing blanking of received information from one or more modules for at least a duration of the transmission.

14. The apparatus of claim 1, wherein the at least one countermeasure comprises freezing a synchronization loop, the synchronization loop comprising at least one of the plurality of included modules, and wherein the control logic is further adapted, in response to the first notifications to cause the synchronization loop to be frozen for at least a duration of the transmission.

15. The apparatus of claim 14, wherein the synchronization loop comprises a pre-fast Fourier transform acquisition module and a post fast Fourier transform acquisition and tracking module, and wherein the control logic module is further adapted to freeze at least one of at least one tracking value associated with the pre-fast Fourier transform acquisition module and at least one tracking value associated with the post fast Fourier transform acquisition and tracking module.

16. The apparatus of claim 14, wherein the plurality of included modules further comprises a freeze logic module coupled to the synchronization loop and to the control logic, the freeze logic module responsive to the control logic module to freeze and unfreeze the synchronization loop, wherein freezing the loop comprises keeping the loop in the state prior to the transmission and unfreezing the loop comprises allowing the loop to begin tracking again.

17. The apparatus of claim 14, wherein the at least one countermeasure further comprises at least one of the following:
  causing an automatic gain control (AGC) loop to be frozen for at least a duration of the transmission;
  causing a channel estimation module to discard channel estimation data for at least a duration of the transmission; and
  causing blanking of received information from one or more modules for at least a duration of the transmission.

18. The apparatus of claim 1, wherein the at least one countermeasure comprises discarding channel estimation data from a channel estimation module, and wherein the control logic module is further adapted, in response to the first notification, to cause the channel estimation module to discard the channel estimation data for at least a duration of the transmission.

19. The apparatus of claim 18, wherein the plurality of included modules comprises a discard logic module coupled to the channel estimation module and to the control logic module, the discard logic module responsive to the control logic module to cause the channel estimation module to discard the channel estimation data and to resume use of the channel estimation data.

20. The apparatus of claim 18, wherein the at least one countermeasure further comprises at least one of the following:
  causing an automatic gain control (AGC) loop to be frozen for at least a duration of the transmission;
  causing a synchronization loop to be frozen for at least a duration of the transmission; and
  causing blanking of received information from one or more modules for at least a duration of the transmission.

21. The apparatus of claim 1, wherein the at least one countermeasure comprises blanking received information from at least one of the plurality of included modules, and wherein the control logic module is further adapted, in response to the first notification, to cause blanking of received information from the at least one of the plurality of included modules for at least a duration of the transmission.

22. The apparatus of claim 21, wherein the at least one of the plurality of included modules comprises at least one of an analog module, a frequency correction module, an equalization and softbit generation module, and an impulse noise canceling module.

23. The apparatus of claim 22, wherein the plurality of included modules further comprises a blanking algorithm module coupled to and responsive to the control logic module and further comprises a blanking logic module coupled to the blanking algorithm module and the at least one given module, wherein the blanking algorithm module is responsive to the control logic module to cause the blanking logic module to blank received information from the at least one of the plurality of included modules.

24. The apparatus of claim 21, wherein the at least one countermeasure further comprises at least one of the following:
   causing an automatic gain control (AGC) loop to be frozen for at least a duration of the transmission;
   causing a synchronization loop to be frozen for at least a duration of the transmission; and
   causing a channel estimation module to discard channel estimation data for at least a duration of the transmission.

25. The apparatus of claim 1, wherein the information in the reception frequency band is broadcast from a first transmitter, wherein the control logic module is further configured to determine when a handover process has started and, in response to starting of the handover process, to delay measurement of receiver signal strength of signals received from at least one additional second transmitter until after the transmission ends.

26. The apparatus of claim 25, wherein the control logic module is further configured to delay measurement of receiver signal strength of signals received from the at least one additional second transmitter until after the plurality of burst transmissions are stopped.

27. A method comprising:
   receiving information in a reception frequency band; and
   responsive to a notification from a transmitter of a transmission in a predetermined transmission frequency band, causing at least one countermeasure to be performed by at least one of a plurality of included modules in response to the notification, the at least one countermeasure predetermined to reduce an effect of interference caused by the transmission on reception of the information in the reception frequency band,
   wherein the transmission is one burst of a plurality of burst transmissions, further including determining whether to cause the at least one countermeasure to be performed for the burst transmission responsive to a notification of which of a plurality of modes is used in the burst transmission.

28. The method of claim 27, wherein the plurality of modes comprises a voice mode and a data mode.

29. An apparatus comprising:
   receiving means comprising a plurality of modules for receiving information in a reception frequency band, and
   for receiving a notification from a transmitter of a transmission in a predetermined transmission frequency band; and
   responsive to the notification, means for causing at least one countermeasure to be performed by at least one of the modules, the at least one countermeasure predetermined to reduce an effect of interference caused by the transmission on reception of the information in the reception frequency band;
   wherein the transmission is one burst of a plurality of burst transmissions, wherein the control logic determines whether to cause the at least one countermeasure to be performed for the burst transmission responsive to a notification of which of a plurality of modes is used in the burst transmission.

30. The apparatus of claim 29, wherein the means for causing further comprises at least one of the following:
   means for causing an automatic gain control (AGC) loop comprising a plurality of first modules to be frozen for at least a duration of the transmission;
   means for causing a synchronization loop comprising a plurality of second modules to be frozen for at least a duration of the transmission;
   means for causing a channel estimation module to discard channel estimation data for at least a duration of the transmission; and
   means for causing blanking of received information from one or more third modules for at least a duration of the transmission;
   and wherein the plurality of modes comprises a voice mode and a data mode.

31. A memory tangibly embodying a program of machine-readable instructions executable by a digital processing apparatus to perform operations in an apparatus comprising a receiver comprising a plurality of modules, the operations comprising:
   receiving information in a reception frequency band; and
   responsive to a notification from a transmitter of a transmission in a predetermined transmission frequency band, causing at least one countermeasure to be performed by at least one of the modules, the at least one countermeasure predetermined to reduce an effect of interference caused by transmission on reception of the information in the reception frequency band; and
   wherein the transmission is one burst of a plurality of burst transmissions, further including determining whether to cause the at least one countermeasure to be performed for the burst transmission responsive to a notification of which of a plurality of modes is used in the burst transmission.

32. The memory of claim 31, wherein the operation of causing further comprises at least one of the following:
   causing an automatic gain control (AGC) loop comprising a plurality of first modules to be frozen for at least a duration of the transmission;
   causing a synchronization loop comprising a plurality of second modules to be frozen for at least a duration of the transmission;
   causing a channel estimation module to discard channel estimation data for at least a duration of the transmission; and
   causing blanking of received information from one or more third modules for at least a duration of the transmission; and
   wherein the plurality of modes comprises a voice mode and a data mode.

33. An integrated circuit comprising:
   a receiver configured to receive information in a reception frequency band, and to receive a notification from a transmitter of a transmission in a predetermined transmission frequency band; and
   control logic configured, responsive to the notification, to cause at least one countermeasure to be performed by at least one of a plurality of modules, the at least one countermeasure predetermined to reduce an effect of interference caused by the transmission on reception of the information in the reception frequency band;

wherein the transmission is one burst of a plurality of burst transmissions, and wherein the control logic is configured to determine whether to cause the at least one countermeasure to be performed for the burst transmission responsive to a notification of which of a plurality of modes is used in the burst transmission.

34. The integrated circuit of claim 33, wherein the predetermined transmission frequency band comprises a frequency band defined by a global system for mobile communications (GSM) standard and the reception frequency band comprises a reception frequency band defined by a digital video broadcasting for handhelds (DVB-H) standard.

35. The integrated circuit of claim 33, wherein the at least one countermeasure comprises at least one of the following:
   causing an automatic gain control (AGC) loop comprising a plurality of first modules to be frozen for at least a duration of the transmission;
   causing a synchronization loop comprising a plurality of second modules to be frozen for at least a duration of the transmission;
   causing a channel estimation module to discard channel estimation data for at least a duration of the transmission; and
   causing blanking of received information from one or more third modules for at least a duration of the transmission; and
wherein the plurality of modes comprises a voice mode and a data mode.

36. An integrated circuit comprising:
a plurality of included modules; and
a control logic module configured, responsive to receiving a first notification of a transmission in a predetermined frequency band, to cause at least one countermeasure to be performed by at least one of the plurality of included modules, the at least one countermeasure predetermined to reduce an effect of interference caused by the transmission on reception of information in a reception frequency band;

wherein the transmission is one burst of a plurality of burst transmissions, and wherein the control logic module is further configured to determine whether to cause the at least one countermeasure to be performed for the burst transmission responsive to a second notification of which of a plurality of modes is used in the burst transmission.

37. The integrated circuit of claim 36, wherein the plurality of modes comprises a voice mode and a data mode.

38. The integrated circuit of claim 36, wherein the at least one countermeasure comprises at least one of:
   causing an automatic gain control (AGC) loop comprising a plurality of first modules to be frozen for at least a duration of the transmission;
   causing a synchronization loop comprising a plurality of second modules to be frozen for at least a duration of the transmission;
   causing a channel estimation module to discard channel estimation data for at least a duration of the transmission; and
   causing blanking of received information from one or more third modules for at least a duration of the transmission.

* * * * *